United States Patent [19]

Riley

[11] Patent Number: 5,852,611
[45] Date of Patent: Dec. 22, 1998

[54] MODULE FOR A SERIAL MULTIPLEX DATA INPUT PROTECTION CIRCUIT

[75] Inventor: Robert E. Riley, Jackson, Miss.

[73] Assignee: Square D Company, Palatine, Ill.

[21] Appl. No.: 565,367

[22] Filed: Nov. 30, 1995

Related U.S. Application Data

[62] Division of Ser. No. 305,253, Sep. 13, 1994, Pat. No. 5,553,070.

[51] Int. Cl.$^6$ ........................................... H04J 3/00
[52] U.S. Cl. ............................... 370/498; 361/91
[58] Field of Search ..................... 370/445, 447, 370/498, 503; 340/825.06, 825.57, 825.52; 364/824.01, 824.03, 824.05, 824.1; 395/200.03, 821; 361/1, 90, 91

[56] References Cited

U.S. PATENT DOCUMENTS

| | | |
|---|---|---|
| 4,234,921 | 11/1980 | Kinoshita et al. .................. 364/424 |
| 4,808,994 | 2/1989 | Riley ................................... 340/825.57 |
| 5,146,560 | 9/1992 | Goldberg et al. ..................... 395/200 |
| 5,577,172 | 11/1996 | Vatland et al. ......................... 395/114 |

*Primary Examiner*—Chi H. Pham
*Assistant Examiner*—Ricky Q. Ngo
*Attorney, Agent, or Firm*—Michael J. Femal; Larry I. Golden

[57] ABSTRACT

A programmable data link module for use with a time division multiplex data bus includes an input and a high voltage protection circuit to prevent outputting of data to the data bus under several different operation conditions. These include programming of the data link module and verification of the programming. The data link module also inhibits the outputting of data signals to the data bus in response to changes of the input signals from a local input device until the power to the data link module has stabilized for a preselected period of time. The high voltage protection circuit protects the data link module from excessive overvoltage from other devices connected to the data bus.

10 Claims, 28 Drawing Sheets

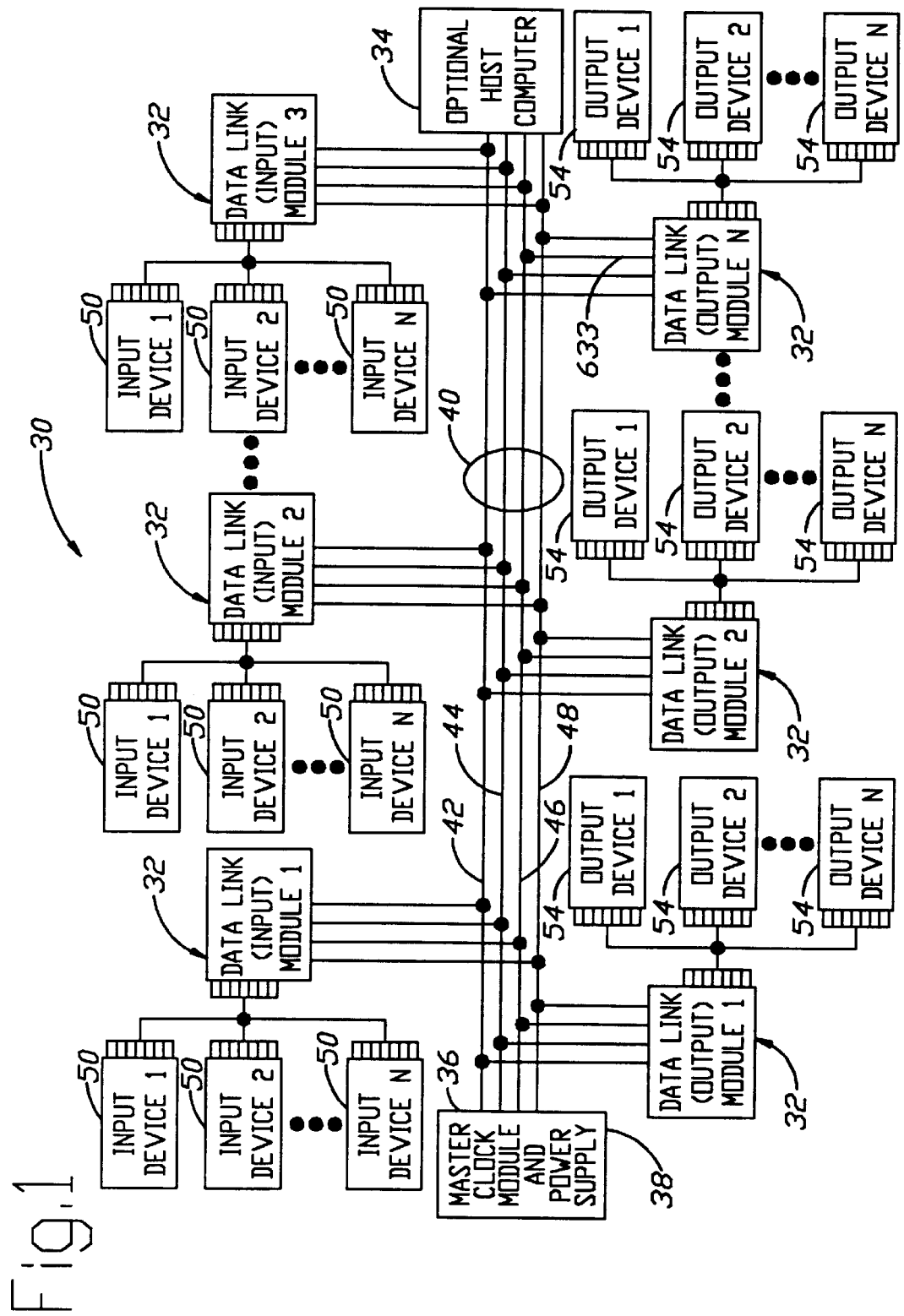

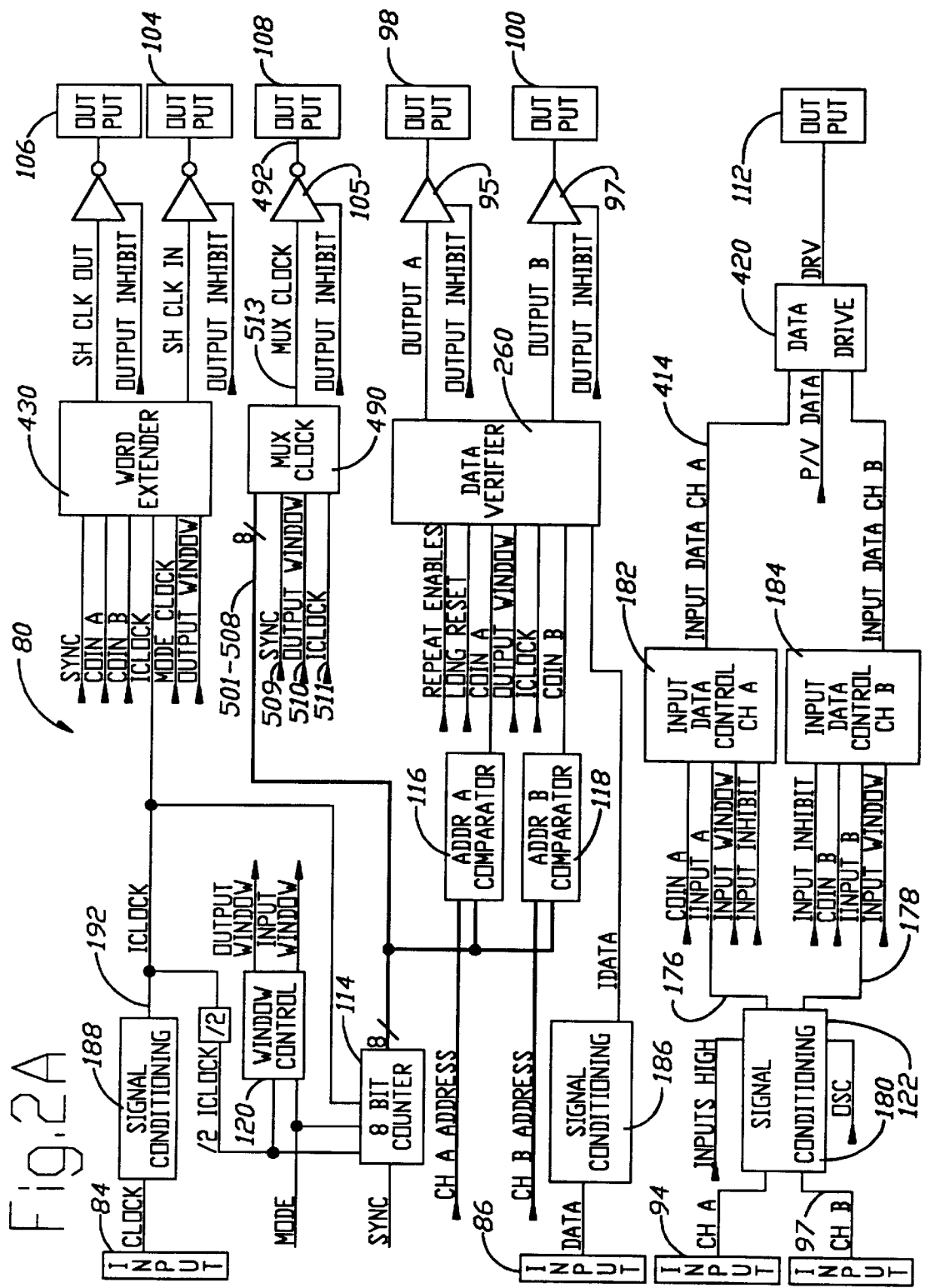

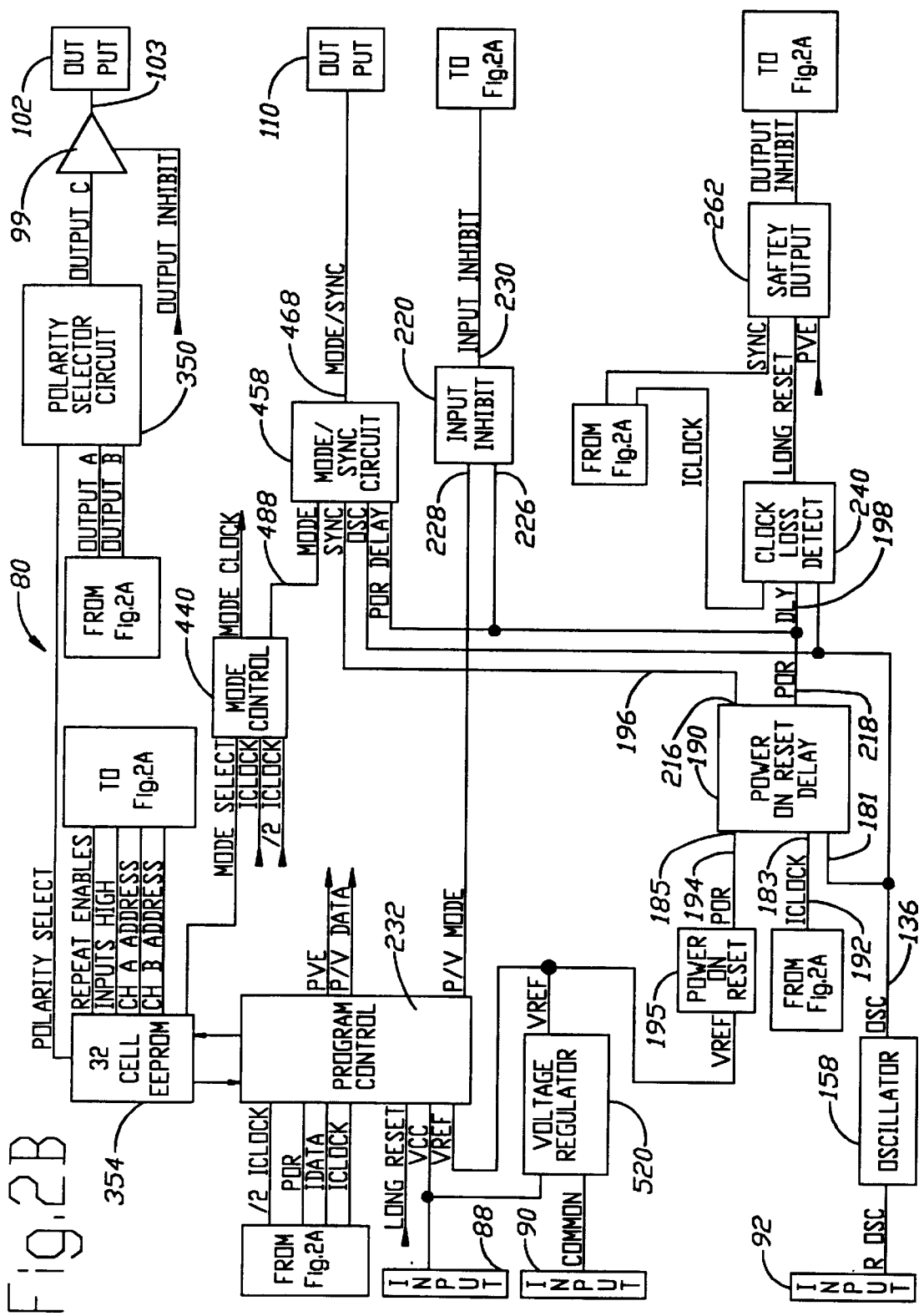

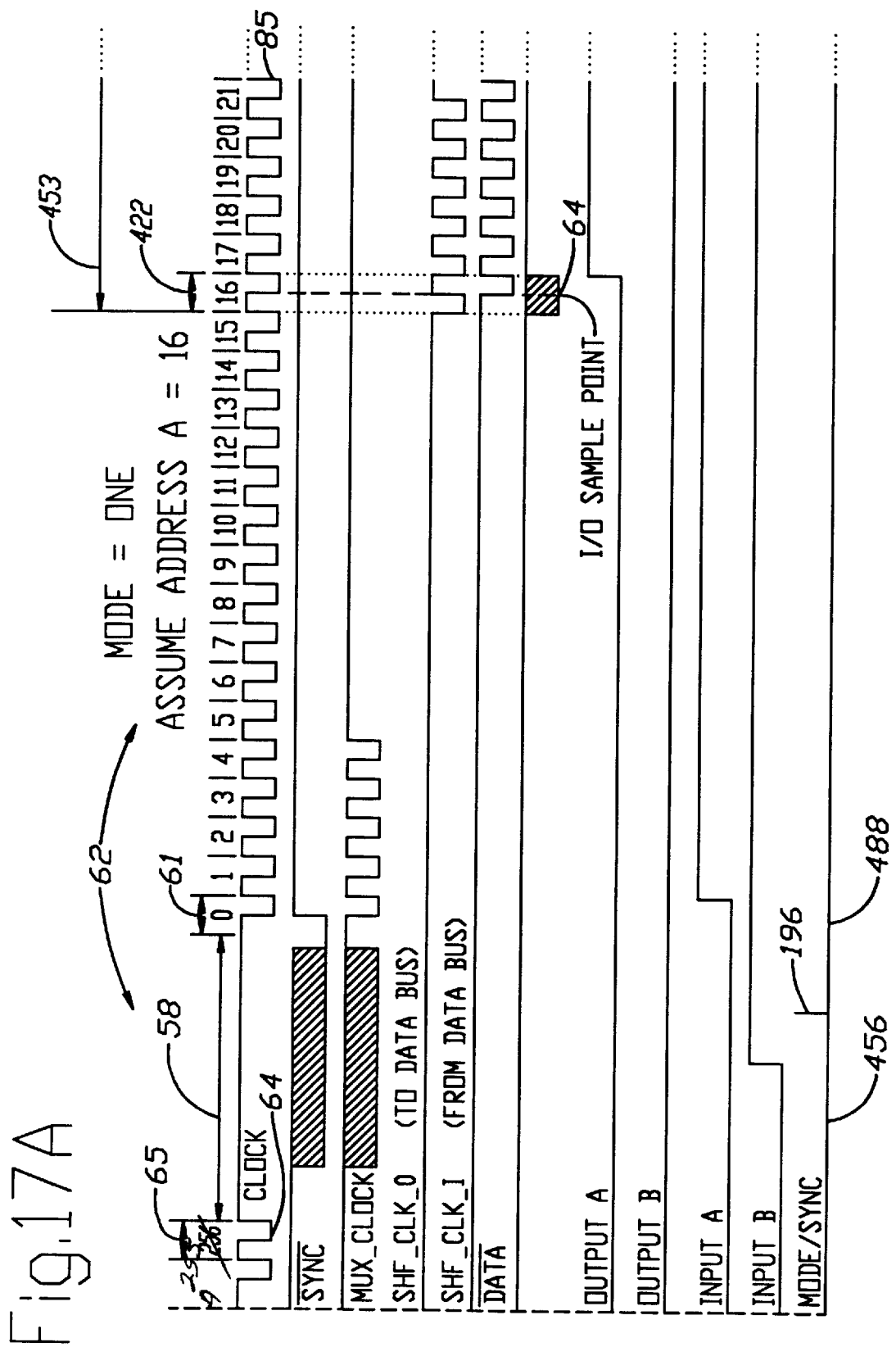

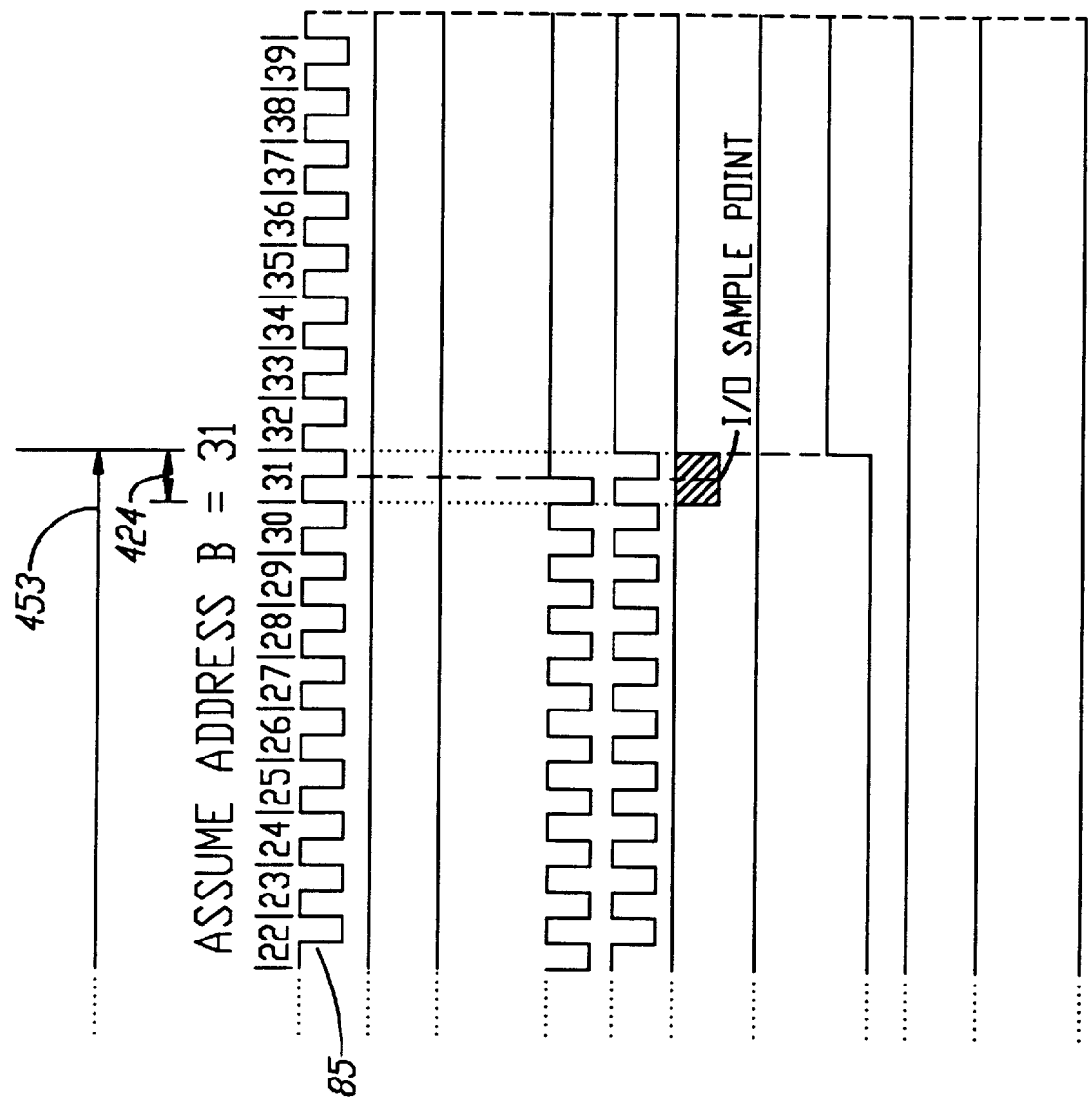

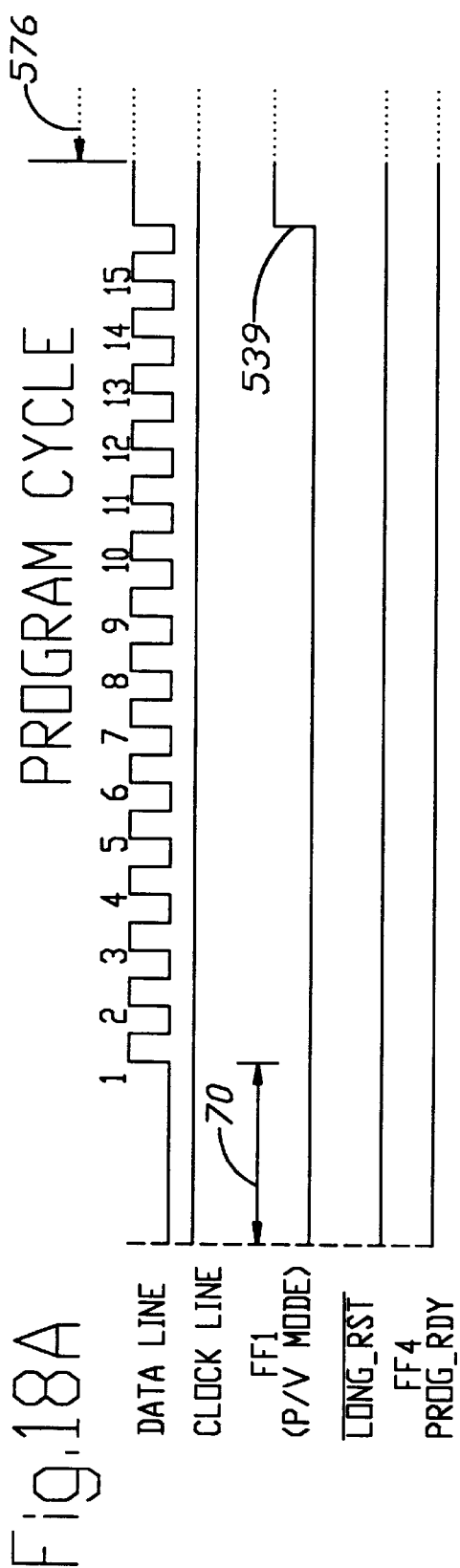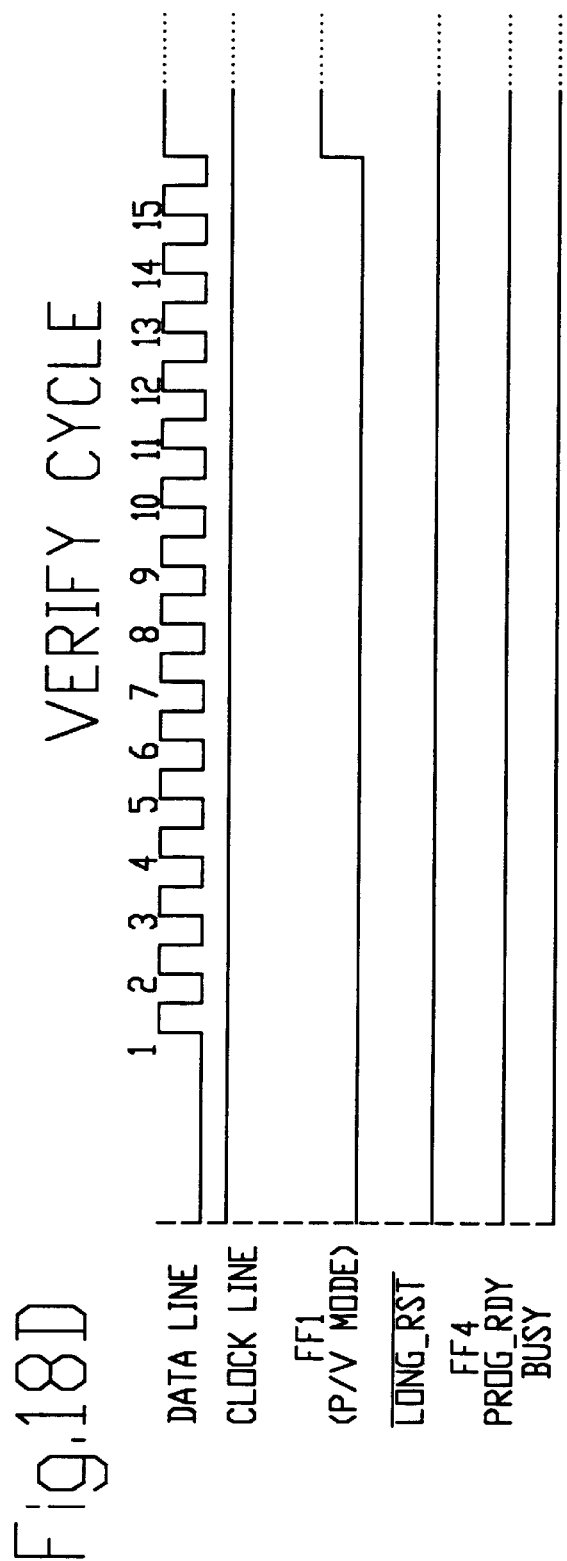

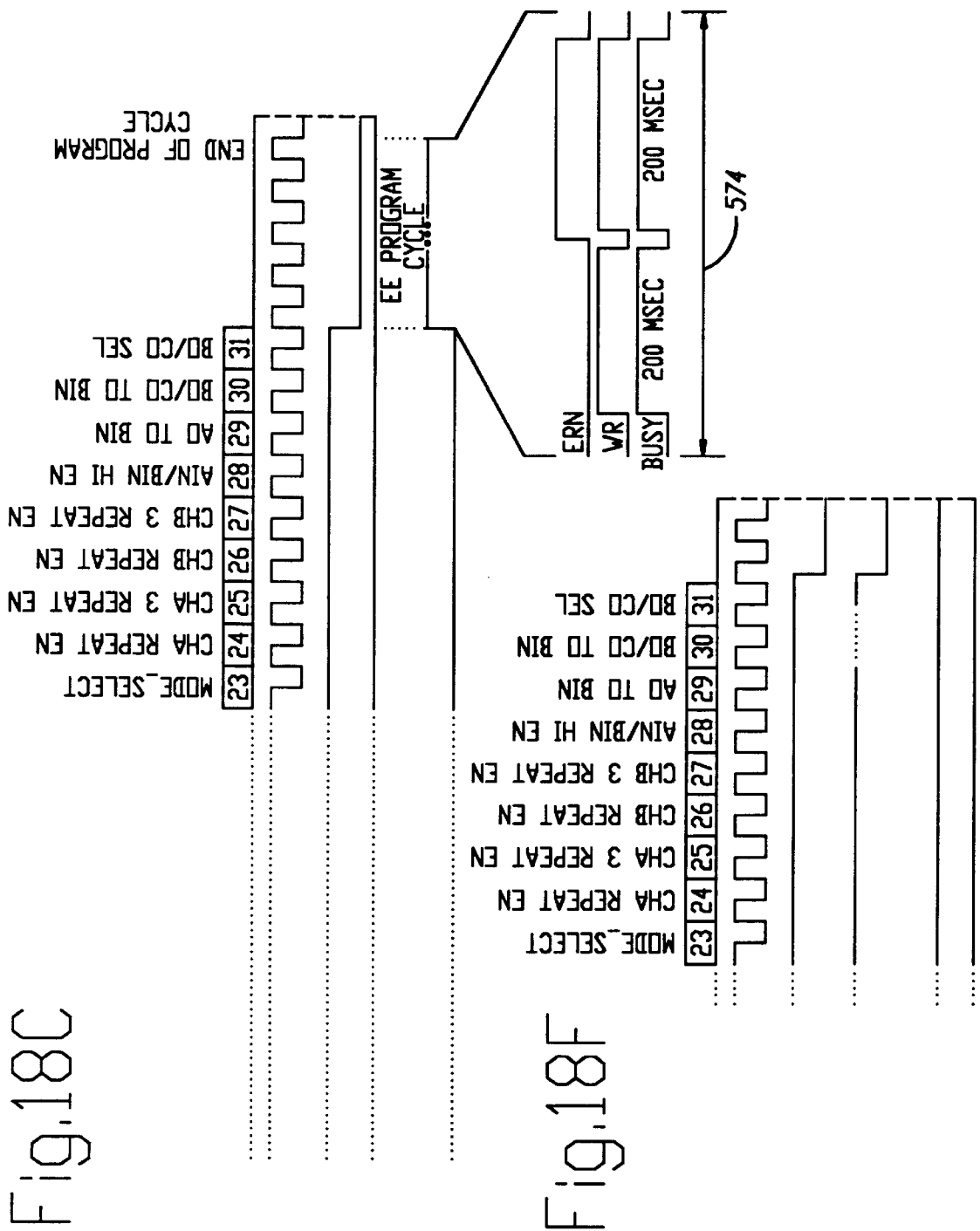

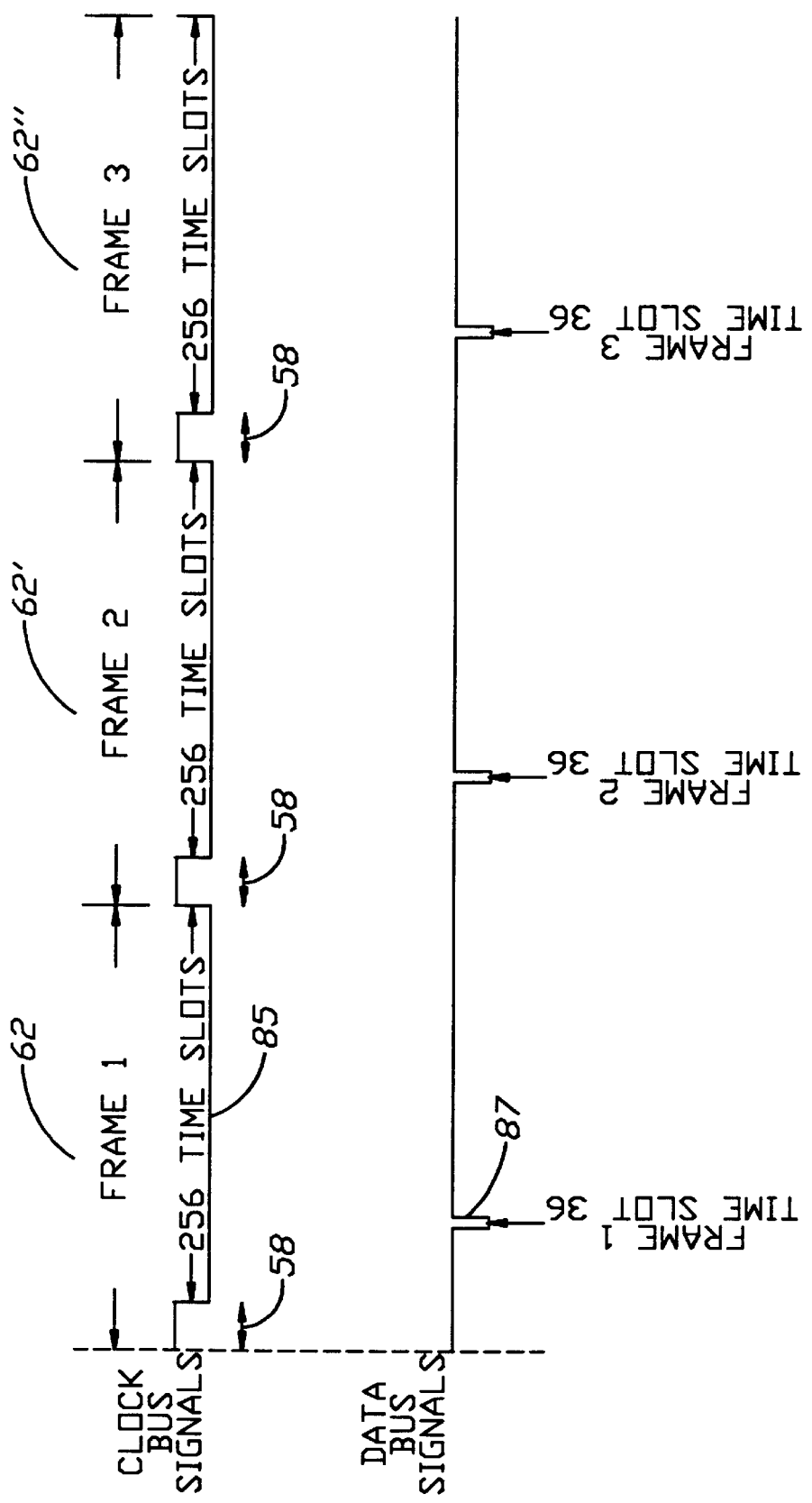

MODULE FOR A SERIAL MULTIPLEX DATA INPUT PROTECTION CIRCUIT

This application is a division of application Ser. No. 08/305,253, filed Sep. 13, 1994, now U.S. Pat. No. 5,553,070.

FIELD OF THE INVENTION

This invention relates generally to the field of control systems and, more particularly, to control systems using data link modules communicating on a serial time division multiplex bus.

DESCRIPTION OF THE RELATED ART

Control systems employing a serial multiplex bus for controlling at least one output device by a plurality of input devices are well known. Some known control systems use software protocols, operating under the direction of a computer, in which all control signal data is conveyed in multi-bit bytes or in packets of multi-bit bytes. Examples of such software protocol control systems are the LonWorks local operating network by Echelon Company of Palo Alto, Calif.; the home automation system Consumer Electronics Bus (CEbus) by the Electronic Industry Association, the Controller Area Network (CAN) by Robert Bosch, GmbH of Stuttgart, Germany and the World Factory Implementation Protocol by the WorldFIP Committee of Research Triangle Park, North Carolina. Known software protocol control systems disadvantageously require multi-bit bytes, typically 16-bit bytes, for conveying only one bit of data. Although software protocol control systems are designed to convey multi-bit bytes or words, they are disadvantageously 10–100 times slower than hardware protocol systems, such as the invention, in conveying multibit words. In most software protocol control systems, the control protocol is composed of a header, the number of words in the transmission, load identification, load status and checksum. In most such systems, a minimum of six 8-bit words are needed to turn on one load. In some software protocol systems, up to three times as many bits are required.

Software protocol systems have their communication capabilities disadvantageously centralized, or lumped, in a computer that uses software to operate the control system; they disadvantageously require the computer in order to function, and therefore, if the computer malfunctions, then the control system will malfunction.

Other serial multiplex control systems use single bits of data to convey control signals and such systems have their communication capabilities distributed throughout the system, usually at each input and output location. Most of these distributed, single-bit systems have hardware protocols without any programmability. An example of this type of single-bit, hardware protocol control system is the Actuator Sensor Interface (ASI) by ASI Verein eV Geschäftsführung of Odenthal, Germany. Other examples are shown and described in U.S. Pat. Nos. 4,052,566 and 4,052,567 issued Oct. 4, 1977 to MacKay; U.S. Pat. No. 4,156,112 issued May 22, 1979 to Moreland; U.S. Pat. No. 4,435,706 issued Mar. 6, 1984 to Callan; and U.S. Pat. No. 4,682,168 issued Jul. 21, 1987 to Chang, et al.

Hardware protocol systems are known to use a programmable logic controller (PLC) which is a computer programmed in ladder logic. Such systems disadvantageously require multiple lengthy cable runs interconnecting the input and output devices to a terminal. The execution speed of a PLC computer is often too slow to provide real time operation.

Most known single-bit, hardware protocol systems are not programmable; however, an example of one such system that is programmable, through firmware, is described in U.S. Pat. No. 4,808,994 issued Feb. 28, 1989 to Riley. Known programmable systems, such as that of the aforesaid patent of Riley require additional dedicated terminals on the module for acceptance of programming information.

Known data link module integrated circuits have a transistor internal to the integrated circuit for driving the data bus voltage low in order to represent a signal in negative logic. Known data bus currents are about thirty milliamperes, and known data bus voltages are about twelve volts. However, the internal transistor used for driving the data bus low in known data link module integrated circuits often fails when the data bus current and voltage becomes slightly higher than normal, such as fifty milliamperes and sixteen volts.

Control systems are used in environments such as manufacturing and assembly factories and are exposed to electromagnetic noise, static, and spikes, pulses and transient voltages (herein referred to collectively as "noise"). Known data link modules passively rely upon the lack of temporal coincidence between noise and signals to avoid noise interference. The presence of noise can cause an output device to respond at an inappropriate moment or fail to respond when the output device should do so. Solely relying upon data signals being synchronized with an edge of a clock pulse has been found insufficient to sufficiently eliminate the effect of noise on a control system.

Known data link modules have a relatively narrow operating voltage range, usually nine to thirteen volts, and it is impossible to use known data link modules with both twelve volt and the popular 24 volt systems without adding additional circuitry external to the integrated circuit for conversion of voltages.

Propagation delays and certain other conditions can produce a false output signal under certain conditions during start-up which are preferably avoided. The known systems respond to changes in an input signal occurring within a timeslot to produce false outputs. Known data link modules also continue to produce an output signal even after a loss of a master clock signal which reduces the degree of control during such conditions.

SUMMARY OF THE INVENTION

It is therefore the principal object of the present invention to provide a data link module for use in a time division multiplexing control system which overcomes the various disadvantages of the known data link module.

This object is achieved in part by provision of a data link module with means for producing output control signals in response to input signals received on a data bus input terminal on a time division basis during an associated one of a plurality of time division multiplexing time slots, the improvement being an input signal conditioner with means for initiating generation of an intermediate data pulse in response to the signals at the data bus input terminal exceeding a pulse initiation threshold voltage, means for terminating generation of the intermediate data pulse in response to the signals at the data bus input decreasing beneath a pulse termination threshold voltage different from the pulse initiation threshold voltage, an intermediate pulse continuity checker for determining whether the intermediate data pulse is extant at each of a plurality of occurrences of the address time slot associated with the data link module and means responsive to the pulse continuity checker for producing a conditioned input signal only when it is determined that the intermediate data pulse is extant during each of said plurality of address time slots.

The object is also achieved by providing a data link module powered by a DC supply voltage with means for producing an output control signal in response to data received on a data bus on a time division multiplexing basis for use in a time division multiplexing control system having a master clock for producing a master clock signal, the improvement being a power on reset delay having means for detecting the application of DC supply voltage to the data link module and means for inhibiting the control signal producing means from changing the output control signal in response to data prior to the continuous application of the DC supply voltage for a preselected time period.

Further, the object is achieved in part by provision of a data link module with a local input terminal to be applied to an input circuit and means for generating an output signal responsive to input signals applied to the input circuit on a time division multiplexing basis, the improvement being a safety input protection circuit having means for detecting a selected one of a plurality of different conditions of the data link module and means responsive to said condition detecting means to inhibit the input circuit from responding to changes in the input signals at the input terminal.

Moreover, object of the present invention is achieved by providing a data link module with an integrated circuit having means for producing a data output signal representative of a data bus signal on a time division multiplexing basis for use in a time division multiplexing control system having a master synchronous clock for producing a master clock signal for establishing time division multiplexing frames, a clock loss output lock having means for detecting loss of the clock signal and means for inhibiting said output signal producing means from changing the state of the output signal despite changes in the data bus signal in response to detecting loss of the master clock signal.

Also, the object is obtained by provision of a data link module with an input terminal for receipt of local input control signals and means for generating output control signals in response to the local input signals, the improvement being a safety output protection circuit having means for sensing at least one condition of the data link module and means responsive to the condition sensing means to inhibit the output control signal generating means from changing output signals in response to the changes in the input signals while said at least one condition is being sensed.

BRIEF DESCRIPTION OF THE DRAWINGS

The foregoing objects and advantageous features of the invention will be explained in greater detail and others will be made apparent from the detailed description of the preferred embodiment of the present invention which is given with reference to the several figures of the drawing, in which:

FIG. 1 is a simplified schematic diagram of a control system using preferred embodiments of data link modules of the present invention;

FIGS. 2A and 2B form a composite functional block diagram of the circuit of a preferred embodiment of a data link module integrated circuit which form part of the Output Modules and Input Modules, or data link modules, of FIG. 1;

FIGS. 17A–17B and 17C–17D form composite timing diagrams showing the master clock signal in relationship with various other signals;

FIGS. 18A–18C and FIGS. 18D–18F form composite diagrams respectively showing the program and verify cycles of the programming circuit of the invention;

FIG. 21 is a set of timing diagrams of three frames of the clock bus signals and the data bus signals shown in detail in FIGS. 17A–17E.

DESCRIPTION OF THE PREFERRED EMBODIMENT

Figure 3A:
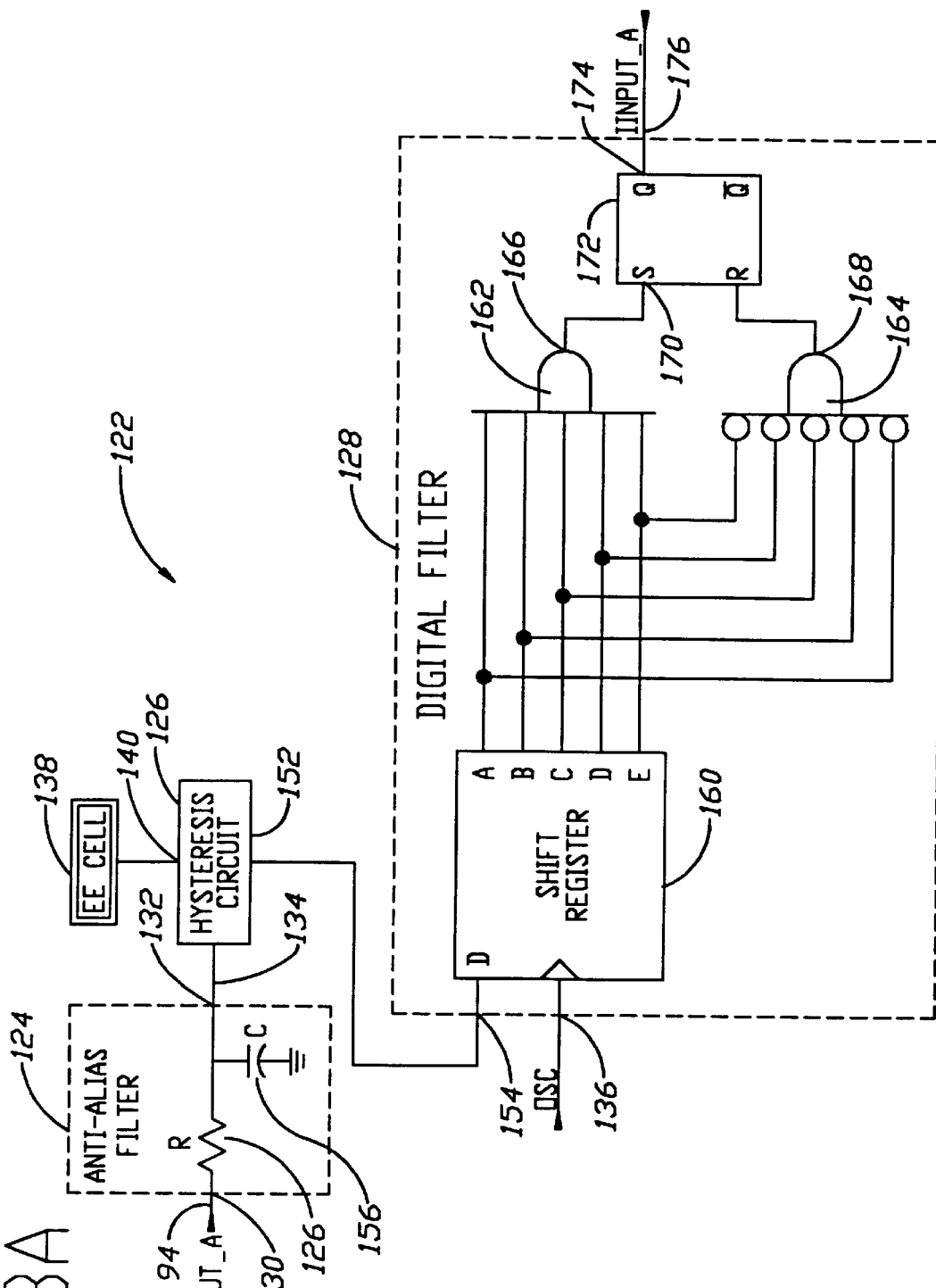
FIG. 3A is a logic circuit diagram of the signal conditioning circuit associated with Input A of the data link module of FIGS. 2A and 2B.

FIG. 1 shows a control system 30 using a plurality of data link modules 32 constructed in accordance with the present invention. The control system 30 is a hardware protocol system, programmable through firmware, that is capable of concurrently conveying single and multi-bit words of data. The control system 30 has its communication capability distributed among a plurality of the data link modules 32. As a result, the use of a computer 34 to operate the control system 30 itself is optional. The control system 30 also includes a master clock module 36 and a power supply 38 which are both connected to a cable 40 preferably having four conductors. The conductors include a direct current voltage power line 42, a master clock line 44, a data bus 46 and a common 48 for the power supply 38. The control system cable 40 is configured in any shape required such as the configurations known as ring, multidrop, loop back, bus and star. Of course, using ring or loop back configurations provides a degree of redundancy. One or more controlling or input devices 50, such as a photosensor controlled switch, are connected to at least one of the data link modules 32. A data link module 32 having an input device 50 connected to it acts as an input module for placing signals on the data bus 46 on a serial multiplex time division basis in response to local input signals from the input device. One or more controlled, or output devices 54, such as a solenoid controlled switch or the like, are connected to at least one of the modules 32. A data link module 32 having an output device 54 connected to its local output acts as an output module for extracting data from the data bus 46 on the serial multiplex time division basis and for producing local output signals to which the output device responds. Each data link module 32 has up to two channels for either inputting signals to the data bus 46 or outputting signals from the bus during a mode one time slot 65 or a mode two time slot 67 shown in FIGS. 17A–17E. FIG. 1 shows, for simplicity of illustration, each data link module 32 acting as either an input module or an output module, as shown in FIG. 1. Alternatively, a data link module 32 can act as both an input and an output module concurrently. In such a case, an input device 50 connected to the data link module 32 is associated with one of the channels and an output device 54 connected to the data link module 32 is associated with the other of the channels.

The data link module operates in either a mode one or a mode two mode of operation. A timing diagram for mode one operation is shown in FIGS. 17A and 17B. The control system 30, FIGS. 1, uses a clock signal timing protocol composed of an elongated sync period 58 followed by up to 256 identical clock cycles 61 labelled 0–256. The sync period 58 and the 256 clock cycles 61 represent a frame 62. The master clock signal 85 is generated by the master clock module 36 and is received by each data link module 32 via the clock line 44 of bus 40. Each of the up to 256 clock cycles 61 represents a potential device address. Each data link module 32 selectively connects one or more of the input devices 50 and one or more of the output devices 54 to the data bus 46 during the time slot, or address, 65 associated with each such device 50 and 54. Depending upon the mode of operation being mode one or mode two, the duration of the address 65 is one or two cycles, respectively, of the control system master clock signal 85. The number of clock cycles 61 per frame 62 is selectable at the master clock module 36 and the number selected is equal to the number of different addresses required. The fewest number of clock cycles 61 needed per frame 62 are selected to optimize the response time of the control system 30.

Referring to FIGS. 2A and 2B, each data link module 32 includes an integrated circuit 80. As shown in FIGS. 17A and 17B, each mode one time slot or address 65 is one full master clock cycle 61 in duration. In mode one, during the first part of the time slot 65, data is placed on the data bus 46 by one or more input data link modules 32 and the data remains on the data bus 46 for the entire time slot. At the midpoint 64 of the time slot 65, the data on the data bus 46 is copied from the bus to output terminals 98 and 100 on at least one output data link module 32 for use by at least one output device 54. New data is placed on the data bus 46 at the end of the time slot 65, i.e. at the beginning of the next time slot, and the process continues for each time slot 65 of a frame 62. Without multiplexing of frames 62, the process repeats itself during subsequent frames. The operation of the process with multiplexing of frames is described hereinafter.

The operation of the control system 30 using single bit input and output signals is described fully in the aforesaid patent of Riley which is hereby incorporated by reference. However, unlike known data link modules designed for the passing of single bits of data, the data link module 32 of the present invention selectively passes either single bit or multi bits of data. For example, a control system 30 using the data link modules 32 is thereby enabled to transfer a sixteen bit word of data from an input device 50 to the data bus 46 and from the data bus 46 to an output device 54 without using complicated circuitry external to the integrated circuit 80 of the data link module 32. Unlike known data link modules, the data link module 32 is programmable to permit any size word of data up to 256 bits without any hardware change to the data link module 32. In FIG. 1, the input and output devices are represented as eight bit devices merely for simplicity of illustration.

This multibit word feature allows the data link module 32 to easily interact with computer based input and output devices, but without requiring a host computer 34 to operate the control system 32 itself. The variable length words allow the data link module 32 to interconnect popular 8, 16 and 32 bit devices by making firmwire changes but without making major hardware changes. Analog data can be conveyed via the data bus 46 of the control system 30 by using multibit words and by using an analog to digital converter (not shown) at an input data link module 32 and a digital to analog converter (not shown) at an output data link module 32.

In addition, a control system using the data link module 32 overcomes a limitation of known devices since it is capable of controlling more than 256 input devices and more than 256 output devices by multiplexing frames 62 without complicated circuitry external to the integrated circuit 80 of the data link module 32.

The control system 30 using data link modules 32 constructed in accordance with the invention selectively operates in mode one or mode two. In mode two, the four conductors 42, 44, 46 and 48 of the control system cable 40 are connected to an option host computer 34, preferably a microprocessor based personal computer, via a single half-slot industry standard architecture (ISA) computer interface card (not shown). The control system 30 appears to the host computer 34 as a 2048 byte block of dual-port random access memory (RAM). The input and output is bit-mapped to an unused location of RAM.

Figure 17C:
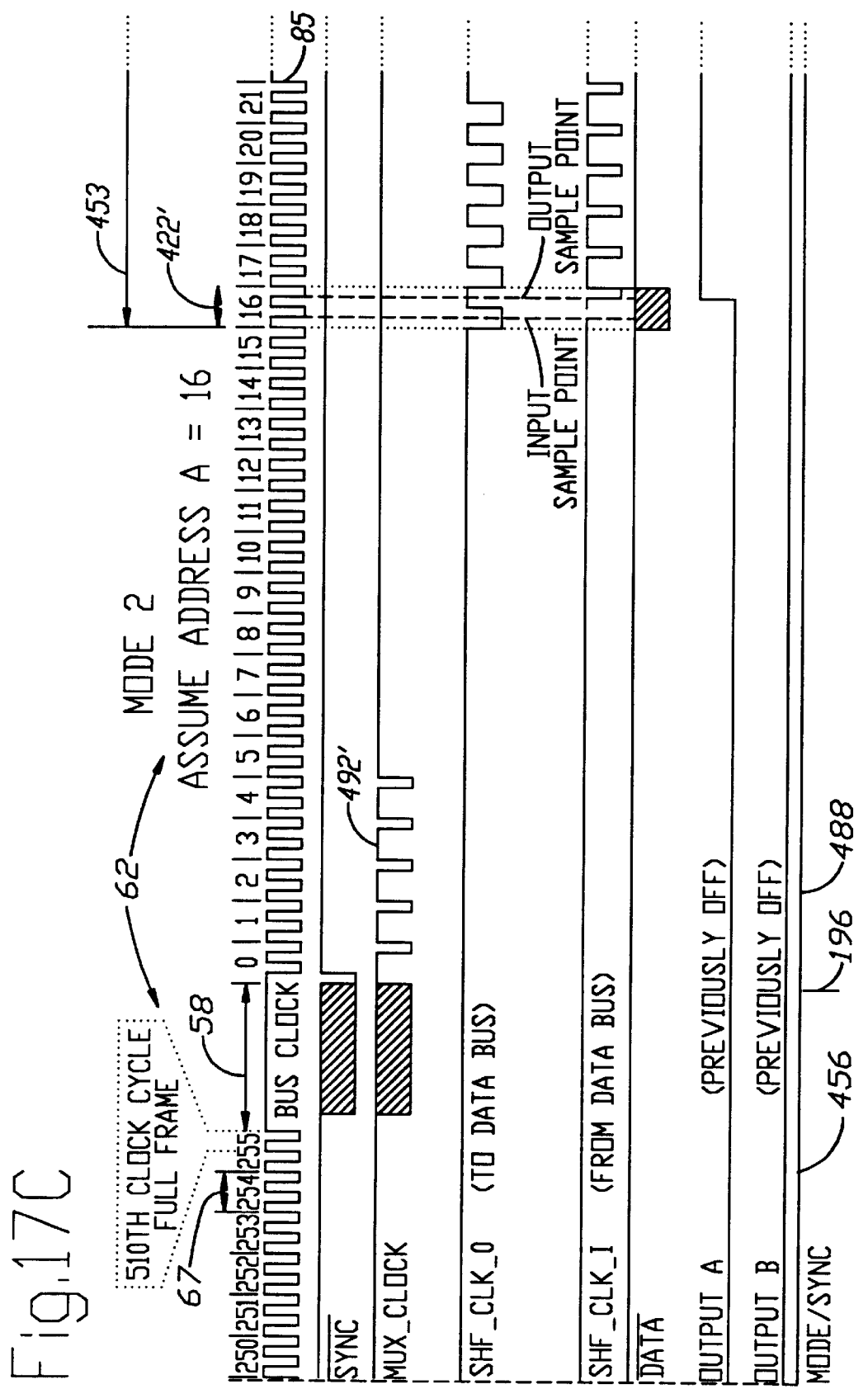
Figure 17D:
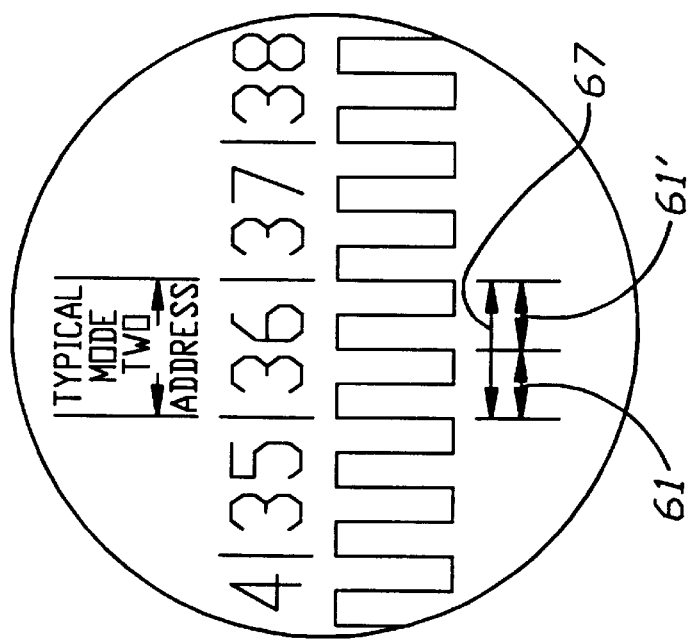
Figure 17E:
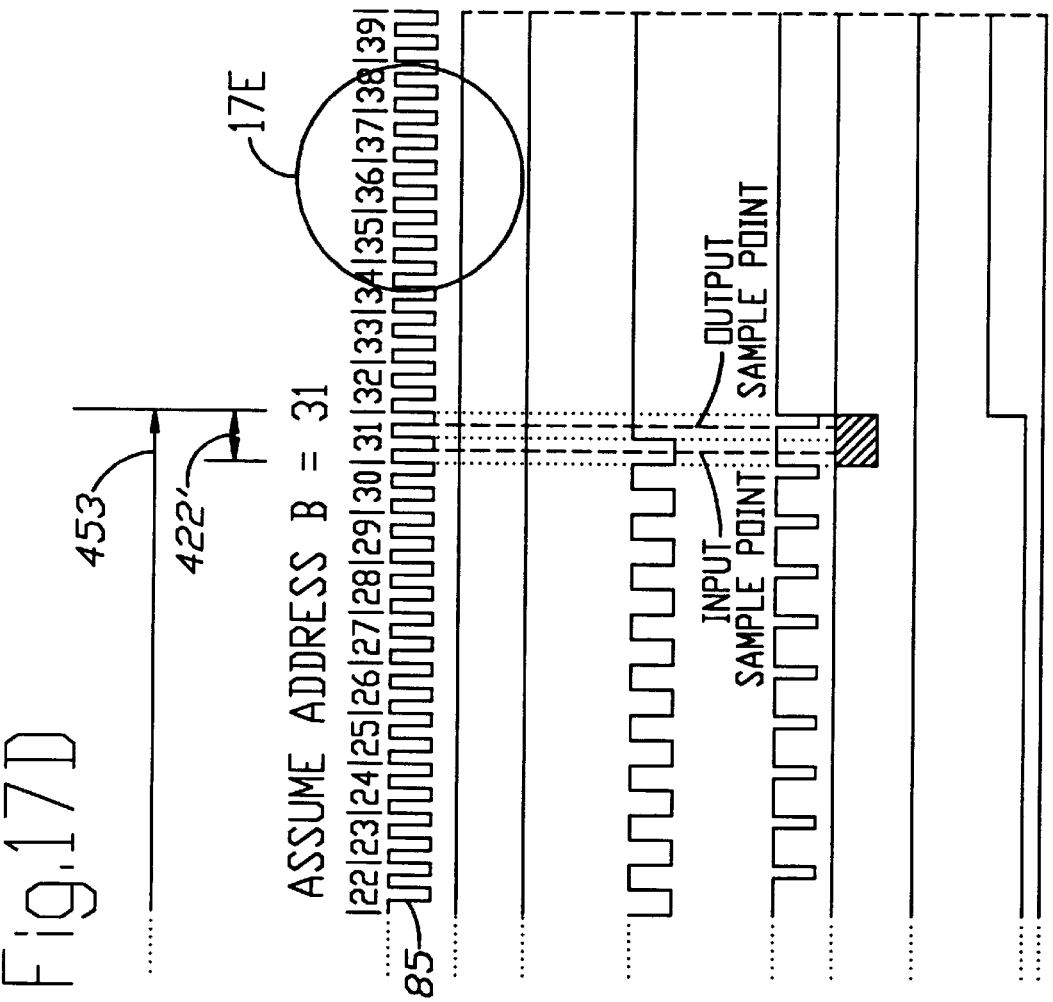
FIG. 17E is an enlarged portion of FIG. 17D.

Referring now to the mode two composite timing diagram, FIGS. 17C and 17D, each mode two address 67 is twice as long (i.e. has twice the duration) as each mode one address 65, FIG. 17A. It should be noted that the scale of FIGS. 17A and 17B is not the same as the scale of FIGS. 17C and 17D. Although the mode two master clock cycles 61 appear shorter in FIGS. 17C and 17D than they do in FIGS. 17A and 17B, this is only for convenience of illustration; the mode two master clock cycles are the same duration as the mode one master clock cycles 61. In mode two, an address 67, such as address "36" in FIG. 17E, is defined by two master clock cycles 61 and 61', FIG. 17E. At the beginning of the first 61 of the two successive clock cycles 61 and 61' in the address 67, data is placed on the data bus 46 by data link modules 32 acting as input modules. The data is latched on the data bus 46 for the duration of the first 61 of the two clock cycles 61 and 61'. The data is copied from the data bus 46 by the optional host computer 34 during the first clock cycle 61. At the beginning of the second clock cycle 61' of the address 67, the optional host computer 34 places a signal on the data bus 46, and the signal is latched for the duration of the second clock cycle 61'. During the second clock cycle 61', data is copied from the data bus 46 by a data link module 32 acting as an output module, and the data is fed to the output device 54 connected to the data link (output) module 32.

Unlike known data link modules, the data link module 32 can operate with a power supply 38 of either approximately twelve volts or approximately 24 volts without requiring adapters. And unlike known data link modules, the data link module 32 can be directly connected to either input devices 50 that represent binary logic levels with 0–5 volts or 0–9 volts.

As shown in block form in FIGS. 2A and 2B, the integrated circuit 80 includes input terminals 84, 86, 88, 90, 92, 94 and 96 for receipt of a master clock signal, or CLOCK; data bus signals, or DATA; an operating voltage, or $V_{cc}$; a voltage common, or COMMON, preferably at ground potential; an external oscillator resistor, (not shown); a channel A input signal, or CH_A; and a channel B input signal, or CH_B, respectively. The integrated circuit 80 has output terminals 98, 100, 102, 104, 106, 108, 110, and 112 for a channel A output signal, or OUTPUT_A; a channel B output signal, or OUTPUT_B; a channel C output signal, or OUTPUT_C; a shift clock in signal, or SH_CLK_IN; a shift clock out signal, or SH_CLK_OUT; a multiplex clock signal, or MUX; a mode/synchronizing signal, or MODE_SYNC; and a data drive signal, or DATA_DRV, respectively.

Each data link module 32 has two channels, channel A and channel B, and each channel is associated with an address. During each time frame 62, an eight bit counter 114 shown in FIG. 2A counts the cycles 61 of the master clock signal 85. The eight bit counter 114 is reset at the beginning of each frame 62. In mode one, each clock cycle 61 corresponds to an address 65. In mode one, the counter 114 counts every clock cycle 61 and the results are fed to address comparators 116 and 118 that compare the count of the counter with the respective addresses for which the data link module 32 has been programmed. When the count matches the address, the associated comparator generates a coincidence A (COIN_A) and a coincidence B (COIN_B) signal, respectively. In mode two, the operation is similar except an address 67 consists of two clock cycles 61 and 61'. As shown in FIG. 2A, the window control section 120 of the integrated circuit 80 feeds a signal to the eight bit counter 114 to compensate for the difference between mode one and mode two.

The operation of the integrated circuit 80 will become clear after the operation of the various sections of it, represented by the blocks in FIGS. 2A and 2B, are individually described in detail hereinafter. Except when essential to understanding the operation of the various circuits, the power supply line 42 and the common line 48, are not shown in the detailed diagrams of the circuits.

Signal Conditioning

As shown in block form in FIG. 2A, the channel A input signal at the channel A input terminal 94 to the integrated circuit 80 is fed through a dual signal conditioning circuit 180 before further processing. The signal conditioning circuit 180 includes a Channel A signal conditioning circuit 122 (shown in FIG. 3A) and a Channel B signal conditioning circuit (not shown). As shown in FIG. 3A, the signal conditioning circuit 122 has an anti-aliasing filter 124, a hysteresis circuit 126, and a digital low pass filter 128. The signal conditioning circuit (not shown) for channel B is essentially identical to the signal conditioning circuit 122 for channel A; therefore, only the signal conditioning circuit for channel A will be described in detail. The input terminal 130 of the signal conditioning circuit is the input terminal 131 to the anti-aliasing filter. The anti-aliasing filter 124 includes a series resistor 136, preferably approximately 470 kΩ, and a capacitor 156 between the input 131 and ground potential, preferably approximately 17 pF. Preferably, the invention of the data link module 32 is used with channel A and channel B input frequencies below 3 kHz; therefore, the anti-aliasing filter 124 has a bandstop of approximately 30 kHz. The output 132 of the anti-aliasing filter 124 is fed into an input 134 of the hysteresis circuit 126.

The hysteresis circuit 126 is programmable to accept a signal having different voltage levels ranges at its input terminal 134. A cell 138 of an electrically erasable read only memory (EEPROM), not shown in its entirety in FIG. 3A, is connected to another input 140 of the hysteresis circuit 126. A logical zero at the cell 138 causes the acceptable input voltage range to be 0–5 volts. A logical one at the cell 138 causes the acceptable input voltage range to be 0–9 volts. The hysteresis circuit 126 prevents false state transitions due to minor voltage level variations. The programmable hysteresis circuit 126 and the cell 138 of the EEPROM function together as a local input voltage range selector.

Figure 3B:
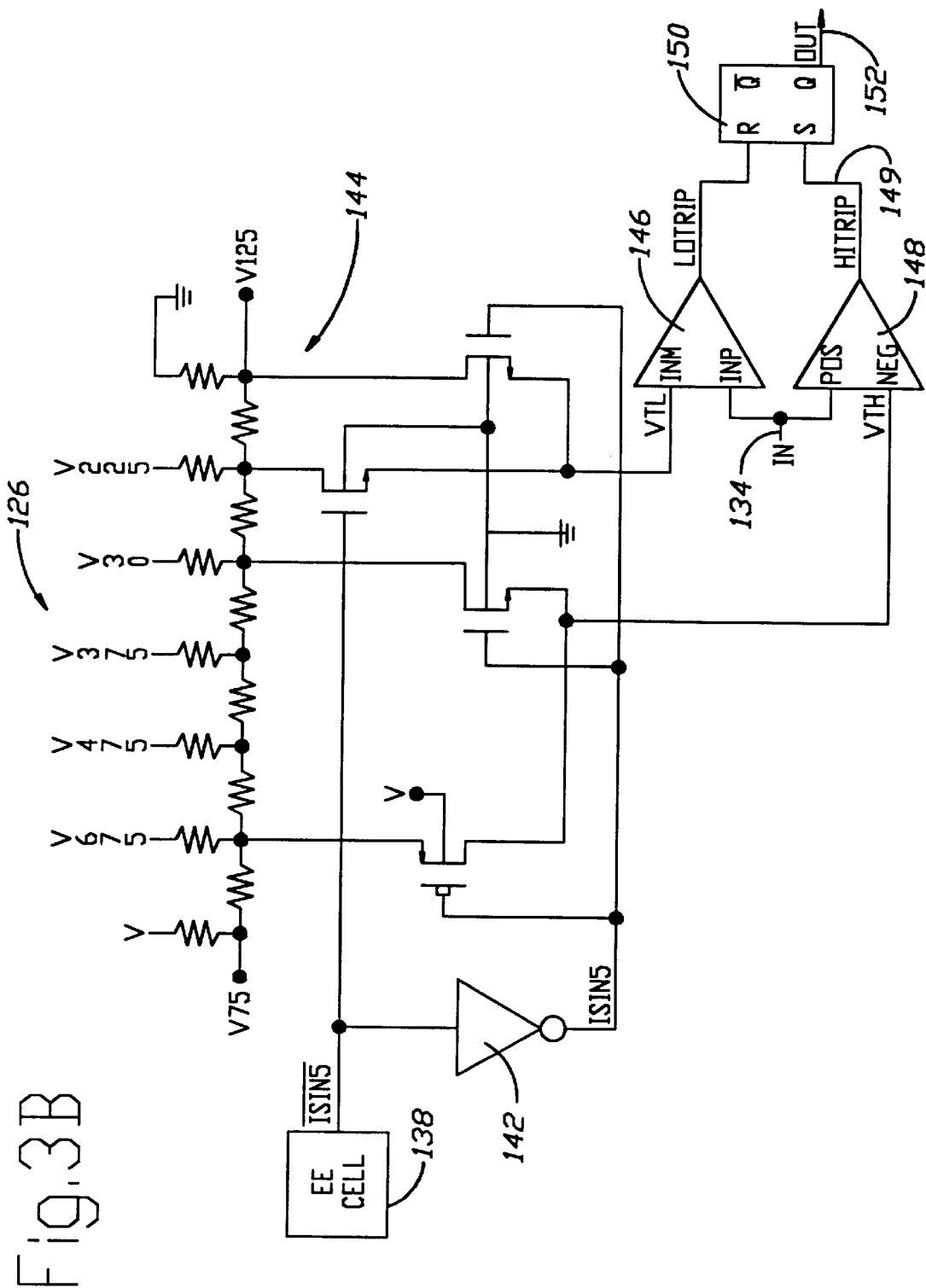
FIG. 3B is a more detailed circuit diagram of the programmable hysteresis circuit of the signal conditioning circuit of FIG. 3A.

The hysteresis circuit 126, shown in more detail in FIG. 3B, includes an inverter 142 for inverting the value stored in the EE cell 138, and a circuit 144 of eight resistors and four transistors for producing two relatively high and two relatively low voltages. The hysteresis circuit 126 is preferably a 50% hysteresis circuit. The two relatively high voltages, 6.75 v and 3.75 v, are 75% of the maximum input voltage expected in 9 v systems and 5 v systems, respectively. The two relatively low voltages, 1.25 v and 2.25 v, are 25% of the maximum input voltage expected in 9 v systems and 5 v systems, respectively. Activation and deactivation of the EE cell 138 causes selection of one of the pair 6.75 v and 2.25 v and the pair 3.75 v and 1.25 v for use by controlling comparators 146 and 148. One of the comparators 148 produces a comparator output signal (HITRIP) 149 in response to a signal at the input terminal 134 of the comparator 148 exceeding 75% of the maximum input voltage. The input terminal 133 of the comparators 146 and 148 is connected to the input terminal 134 of the hysteresis circuit 126. The comparator output signal (HITRIP) 149 sets a flip-flop 150. The Q output terminal 152 of the flip-flop 150 is the output terminal of the hysteresis circuit 126. The output signal 135 of the hysteresis circuit 126 is a flat wave that remains high until the voltage of the signal 125 at the input terminal 134 of the hysteresis circuit falls below 25% of the maximum input voltage, at which time the other comparator 146 produces another comparator output signal (LOTRIP) 147 to reset the flip-flop 150 thereby bringing the signal 152 at the output terminal 136 of the hysteresis circuit to zero volts. The signal 135 at the output terminal 152 of the hysteresis circuit 126 is feed into an input terminal 154 of the digital filter 128. An output signal 135 from of an internal oscillator 158 shown in block form in FIG. 2B is feed into the digital filter 128 to control the bandstop of the digital filter. The bandstop frequency is determined by the frequency of the internal oscillator 158 divided by five. Preferably, the frequency of the internal oscillator 158 is approximately 150 kHz. The digital filter 128 is comprised of a multi-bit, preferably five bit, serial-in, parallel-out shift register 160. The output signal 163 from the shift register 160 is simultaneously presented to a positive pulse consecutivity checker 162 and to a negative pulse consecutivity checker 164, each comprised of a multi-input, preferably five-input, AND gate 166 and 168, respectively. The positive pulse consecutivity checker 162 produces a signal at input terminal S 170 of an RS flip-flop 172 only when a signal is extant during each of a plurality of consecutive cycles of the internal oscillator 158. The RS flip-flop 172 retains at output Q terminal 174 a logical one output until reset by the negative pulse consecutivity checker 164. The output Q terminal 174 of the RS flip-flop 172 is connected to the output terminal 176 of the channel A signal conditioning circuit 122. An IINPUT_A signal, being a conditioned INPUT_A signal, is produced on the output terminal 176 of the channel A signal conditioning circuit 122. The output terminal 176 of the signal conditioning circuit 122 for channel A and the output terminal 178 of the signal conditioning circuit (not shown) for channel B are coupled to the channel A and the channel B, respectively, input data control circuits 182 and 184.

The data bus 46 and master clock bus 44 conditioning circuits 186 and 188, respectively, operate in a manner similar to the channel A and B inputs signal conditioning circuit 122 (not shown) except for the frequencies involved. Preferably the invention of the data link module 32 is used at clock bus 44 and data bus 46 frequencies below 200 kHz; therefore, the data bus and clock bus anti-aliasing filters 186 and 188 have an anti-aliasing filter resistor 126 of preferably 100 kΩ and the signal conditioning circuits preferably have a break point of approximately 225 kHz. In a similar manner, the data bus signal conditioning circuit 186 and the master clock bus signal conditioning circuit 188 produce conditioned signals IDATA 191 and ICLOCK 192 from signals DATA 87 and CLOCK 85, respectively.

Power on Reset Delay

Referring now to FIG. 2B, the internal oscillator 158 of the integrated circuit 80 has a frequency range of preferably 50–400 kHz. The frequency is controlled by the external resistor R (not shown) connected from input terminal 92 to ground, where R (in ohms)=14.5×10$^9$/freq. (in Hertz). Preferably, R is between 25–200 kΩ. The internal oscillator 158 is of a type generally known and is not part of the invention. The internal oscillator 158 produces a signal OSC 159.

As shown in block form in FIG. 2B, a power on reset delay circuit 190 has three input terminals 181, 183 and 185 for receipt of the oscillator signal (OSC) 159, the internal master clock signal (ICLOCK) 192, and a power on reset signal (POR) 194. The POR signal 194 occurs immediately after application of power to the integrated circuit 80 and is produced by one of several well known power-on-reset means 195 and is not part of the invention. The power on reset delay circuit 190 has two output terminals 216 and 218 for outputting a synchronous signal (SYNC) 196 and a power on reset delay signal (POR_DLY) 198, respectively.

Figure 4:
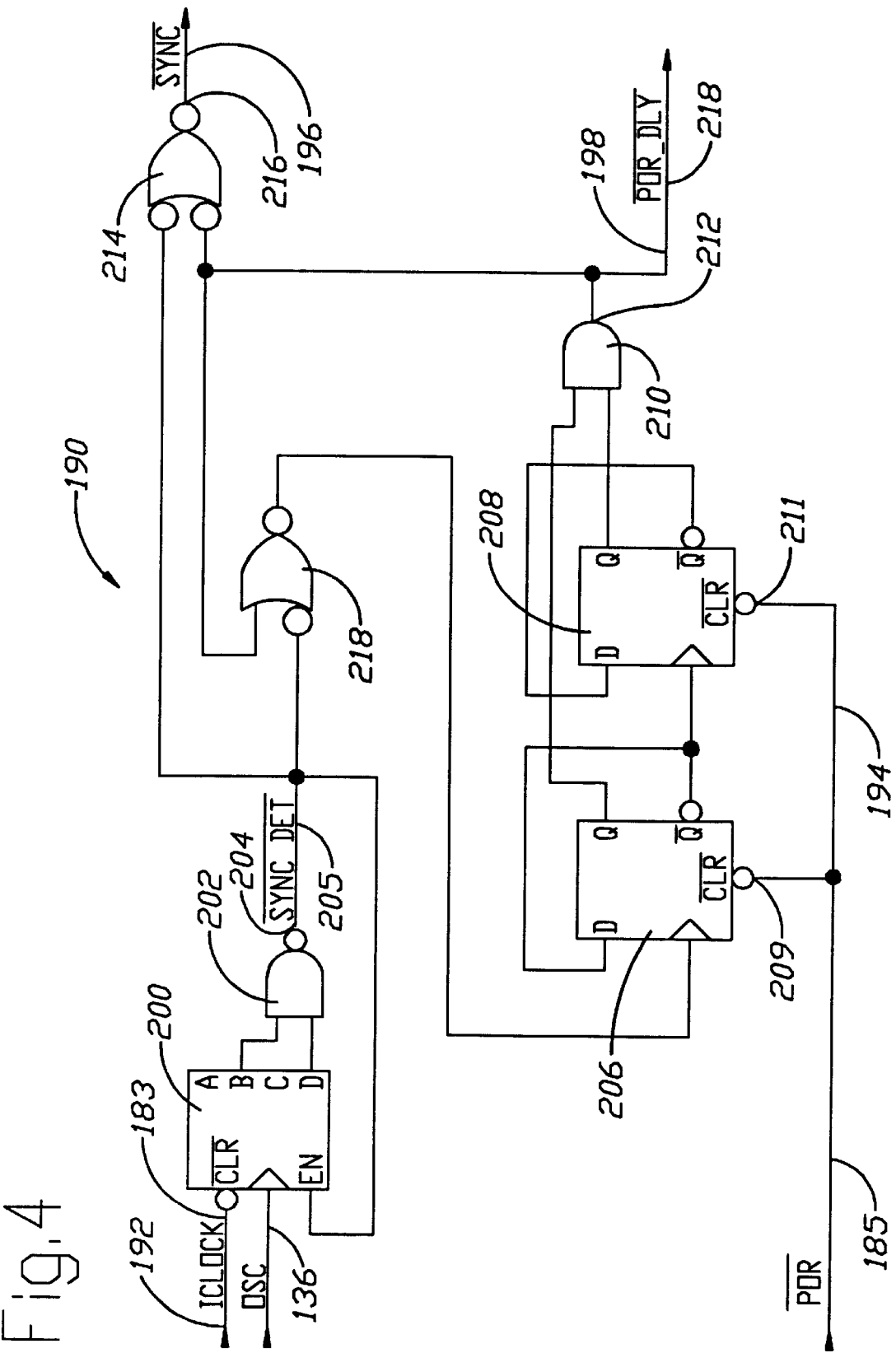
FIG. 4 is a logic circuit diagram of the Power On Reset Delay functional block of FIGS. 2A and 2B.

The power on reset delay circuit 190 is shown in detail in FIG. 4. The internal master clock signal (ICLOCK) 192 is held high for a preselected sync period 58 in order to define the beginning of each time frame 62. Preferably, the sync period 58 has a duration of eight master clock cycles 61. A four bit counter 200 and a NAND gate 202 produce a low SYNC_DET signal 205 at the output terminal 204 of the NAND gate 202 upon receiving ten cycles of the OSC signal 159 while ICLOCK 192 is, during the same interval, continuously high. The ICLOCK signal 192 is fed into an inverted clear input 183 of the counter 200. The SYNC_DET signal 205 remains low for a period dependent upon the relationship between the ICLOCK frequency and the OSC frequency; however, on the first negative transition of ICLOCK, which defines the end of the sync period 58, SYNC_DET become high again because the negative ICLOCK pulse clears the counter 200. Preferably, the OSC frequency is one and one-half to ten times faster than the ICLOCK frequency.

The SYN_DET signal 205 is fed into a plurality of interconnected data flip-flops 206 and 208 and then into an AND gate 210. The flip-flops 206 and 208 are cleared upon receipt of the low POR signal 194 at flip-flop inputs 209 and 211, respectively. The output 212 of the AND gate 210 produces the low POR_DLY signal 198 immediately after receipt of the low POR signal 194. The output 212 of the AND gate 210 produces a high POR_DLY signal 198 after the plurality of data flip-flops 206 and 208 receive a plurality of SYNC_DET signals via gate 201.

The circuit shown in FIG. 4 produces the high POR_DLY signal 198 after receiving three SYNC_DET signals 205. Although only two data flip-flops 206 and 208 are shown in FIG. 4 for simplicity, it is preferable to have approximately 12 data flip-flops for counting 4,095 SYNC_DET signals 205 prior to producing the high POR_DLY signal 198. The power on reset delay circuit 190 produces the POR_DLY signal 198 after the integrated circuit 80 receives a preselected plurality of SYNC_DET signals 205 after application of power to the integrated circuit. The POR_DLY signal 198 and the SYNC_DET 205 signal are gated through an AND gate 214 to produce a SYNC signal 196 at the output 216. Therefore, SYNC 196 remains low unless POR_DLY 198 is high.

Many of the flip-flops of the integrated circuit 80 are either preset or cleared by SYNC 196; therefore, these flip-flops are advantageously preset or cleared only after the power supply to the data link module 32 has stabilized. The POR_DLY signal 198 is fed to the clock loss output lock circuit 240, to the safety input inhibit protection circuit 220, and to the mode/sync circuit 458.

Safety Input Protection Circuit

As shown in block form in FIGS. 2A and 2B, the safety input protection circuit or input inhibit circuit 220 prevents the input data control circuits 182 and 184 from responding to input signals during a preselected period of time after power is applied to the integrated circuit 80 and also during the period of time that the integrated circuit is being programmed or the programming is being verified. As shown in more detail in FIG. 5, the input inhibit circuit 220 has an NOR gate 224 having the active low POR_DLY signal 198 and an active high program/verify mode signal (P/V_MODE) 199 as inputs fed into input terminals 226 and 228, respectively, and having an INPUT_INHIBIT signal 229 as an output signal at output terminal 230.

Figure 5:
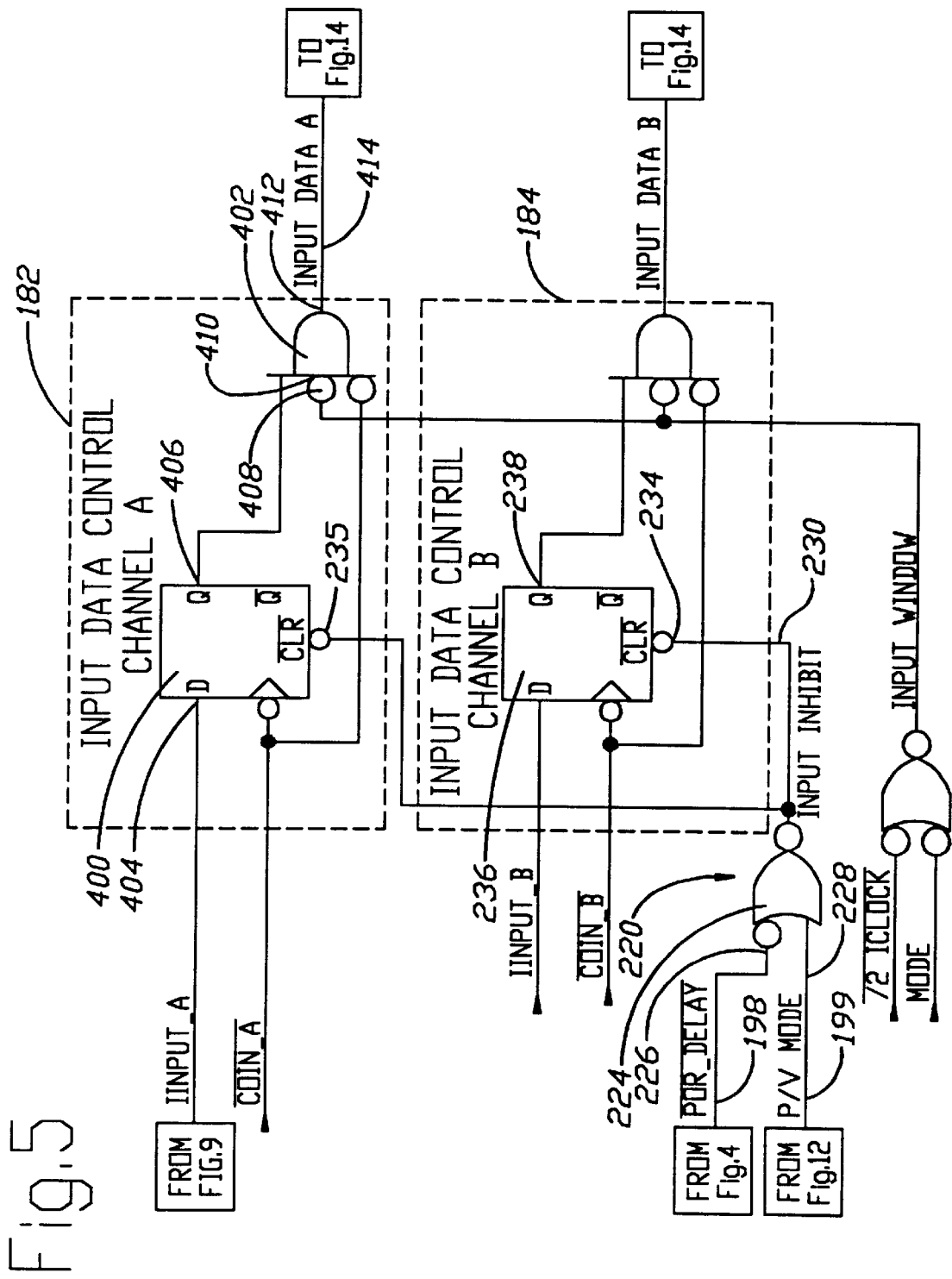
FIG. 5 is a logic circuit diagram of the Input Inhibit, the Channel A Input Data Control, the Channel B Input Data Control and part of the Window Control functional blocks of FIGS. 2A and 2B.

The low POR_DLY signal 198 is produced by the power on reset delay circuit 190 for a preselected period of time after power is applied to the integrated circuit 80. A high P/V_MODE signal 199 is produced by the module programmer 232 during the programming cycle and during the verifying cycle. The POR_DLY signal 198 and the P/V_ MODE signal 199 are applied to the inputs 226 and 228 of the input inhibit circuit 220. The output terminal 230 of the input inhibit circuit 220 is coupled to input terminals 416 and 418 of the channel A and channel B input data control circuits, 182 and 184, respectively. The input inhibit circuit 220 works in conjunction with the channel A and channel B input data control circuits, 182 and 184, respectively. The operation of the channel A input data control circuit is essentially the same as the operation of the channel B input data control circuit so only the channel A circuit will be described in detail. As shown in FIG. 5, the INPUT_ INHIBIT signal 229 at the input terminal 416 is fed into an inverted clear (CLR) terminal 235 of a flip-flop 400. As a result, a signal at an output Q terminal 406 of the flip-flop 400 becomes zero when either the signal POR_DLY 198 is low or the signal P/V_MODE 199 is high. Therefore, the subsequent stages of the integrated circuit 80 will not respond to input A or input B signals under preselected conditions to enhance safety and reliability of the data link module 32. Preferably, the preselected conditions are when either the signal POR_DLY 198 is low or when the signal P/V_MODE 199 is high.

Clock Loss Output Lock

Figure 6:
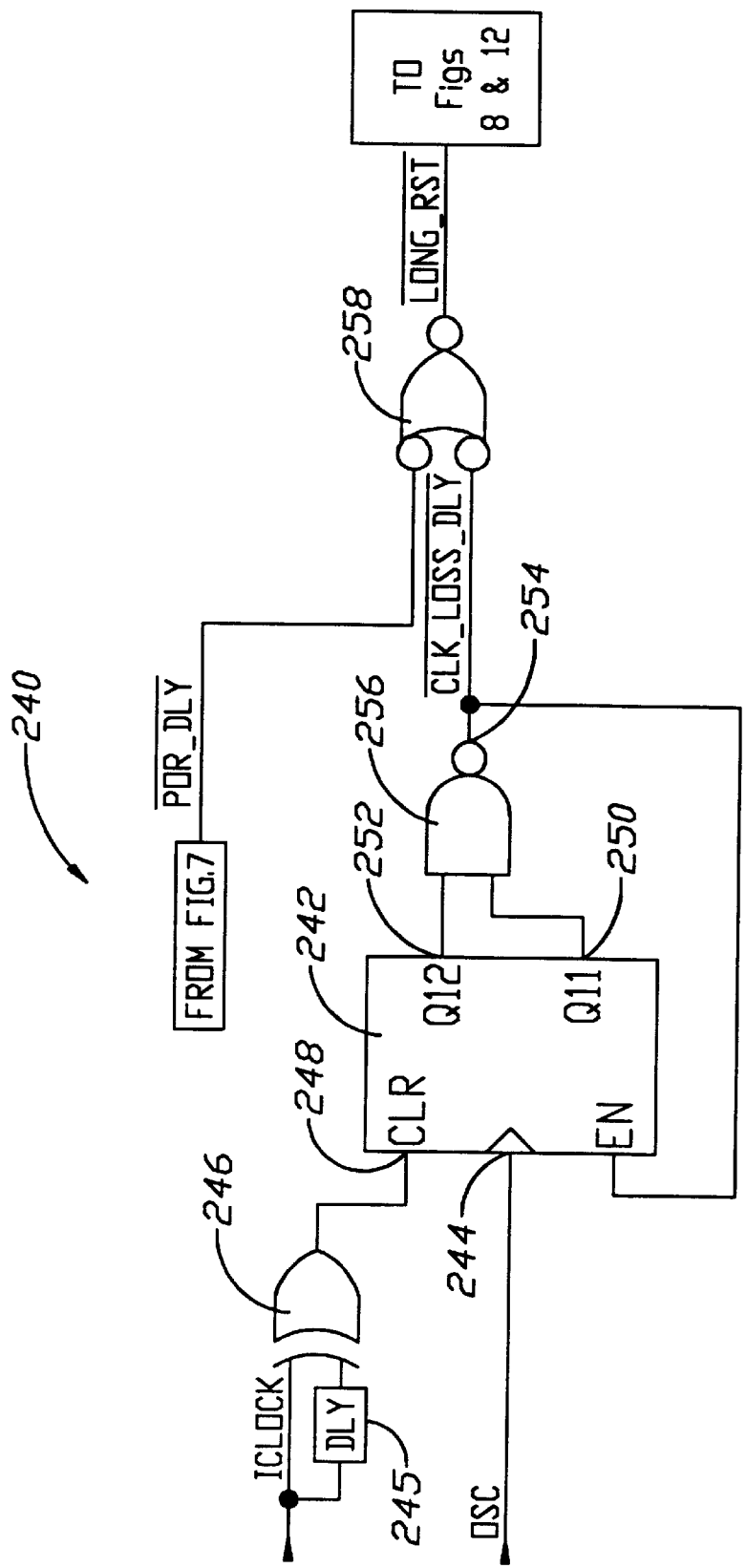
FIG. 6 is a logic circuit diagram of the CLOCK LOSS DETECT functional block of FIGS. 2A and 2B.

It is advantageous to prevent signals at the output terminals 98, 100, 102, 104, 106 and 108 of the integrated circuit 80 from changing in the absence of the master clock signal 85. The integrated circuit 80 has a clock loss detect circuit 240 shown in block form in FIG. 2B. The clock loss detect circuit 240 shown in more detail in FIG. 6 has three input terminals 221–223 for receipt of ICLOCK 192, OSC 159 and POR_DLY 198 signals and one output terminal 225 producing a long reset signal (LONG_RST) 241. The clock loss detect circuit 240 includes a thirteen bit counter 242 which starts to count the cycles of OSC 159 if there is a loss of the internal master clock signal ICLOCK 192. The OSC signal 159 is fed to the clocking pin 244 of the thirteen bit counter 242. The loss of ICLOCK 192 is determined by a delay element (DLY) 245 and an exclusive-OR gate 246 connected to the clear (CLR) pin 248 of the counter 242. When ICLOCK 192 is extant, the counter 242 is cleared on every transition of ICLOCK. Upon counting 6,144 cycles of the OSC signal 159, outputs 250 and 252 of the counter 242, representing the twelfth and thirteen bits of the number 6,144 in binary, are high which causes a NAND gate 256 to produce a low clock loss delay (CLK_LOSS_DLY) signal at its output 254.

The clock loss detect circuit 240 begins to produce a low CLK_LOSS_DLY signal commencing 6,144 cycles of OSC after loss of the master clock signal and the circuit continues to produce the low CLK_LOSS_DLY signal until reinstatement of the master clock signal. The POR_ DLY signal and the CLK_LOSS_DLY signal are coupled through an AND gate 258 to produce a long reset (LONG_ RST) signal. The LONG_RST signal is fed to the repeat circuit 260 and to the safety output protection circuit 262.

Safety Output Protection Circuit

It is important to prevent the multiplex clock 108, shift clock out 106, shift clock in 104, the A, B, and the C outputs 98, 100 and 102 terminals from outputting under certain conditions. As shown in block form in FIG. 2B, the integrated circuit 80 has a safety output protection circuit 262 that prevents the output terminals 98, 100, 102, 104, 106 and 108 of the integrated circuit 80 from having an output signal in the presence of either a low LONG_RST signal or during programming or verifying of the programming.

Figure 7:
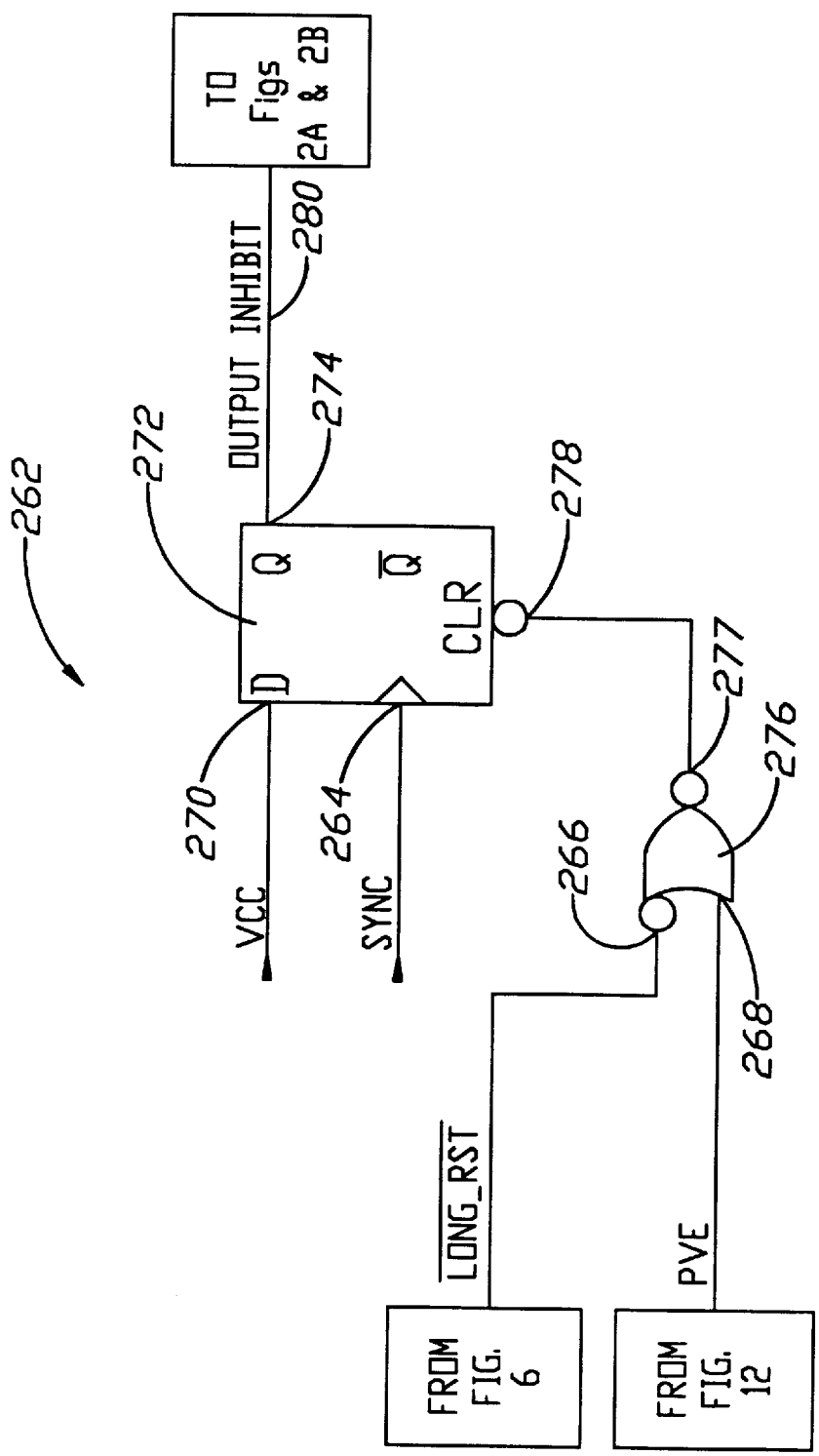
FIG. 7 is a logic circuit diagram of the Output Inhibit functional block of FIGS. 2A and 2B.

As shown in more detail in FIG. 7, the safety output protection circuit 262 has three input terminals 264, 266 and 268 for receiving SYNC, LONG_RST and a program voltage enable (PVE) signal, respectively. The control system power line voltage $V_{cc}$ is applied continuously to a D input terminal 270 of a data flip-flop 272. The data flip-flop 272 produces a high output inhibit signal at Q 274 as a result of the voltage $V_{cc}$ applied to the D input terminal 270 of the flip-flop 272, except when cleared by one of a high PVE signal and a low LONG_RST signal. The circuit also includes an NOR gate 276 that combines the high PVE and the low LONG_RST signals to form one reset signal at the NOR gate output terminal 277 prior to the signals being applied to a clear pin 278 of flip-flop 272. A low reset signal clears the flip-flop 272. The SYNC signal enables the flip-flop 272 at the beginning of each frame 62 and as a result the flip-flop is set by the first SYNC signal after the reset signal is removed. Referring now to FIGS. 2A and 2B, the output of the safety output protection circuit 272 is an output inhibit signal (OUTPUT INHIBIT) 280 which is fed to a tristate device at each of the output terminals 98, 100, 102, 104, 106 and 108, respectively, forcing those output terminals of the integrated circuit 80 into a high impedance state. The high impedance state of the output terminals 98, 100, 102, 104, 106, and 108 is indicative of an absence of both a high signal and a low signal at the output terminals.

Data Verifier

Figure 8:
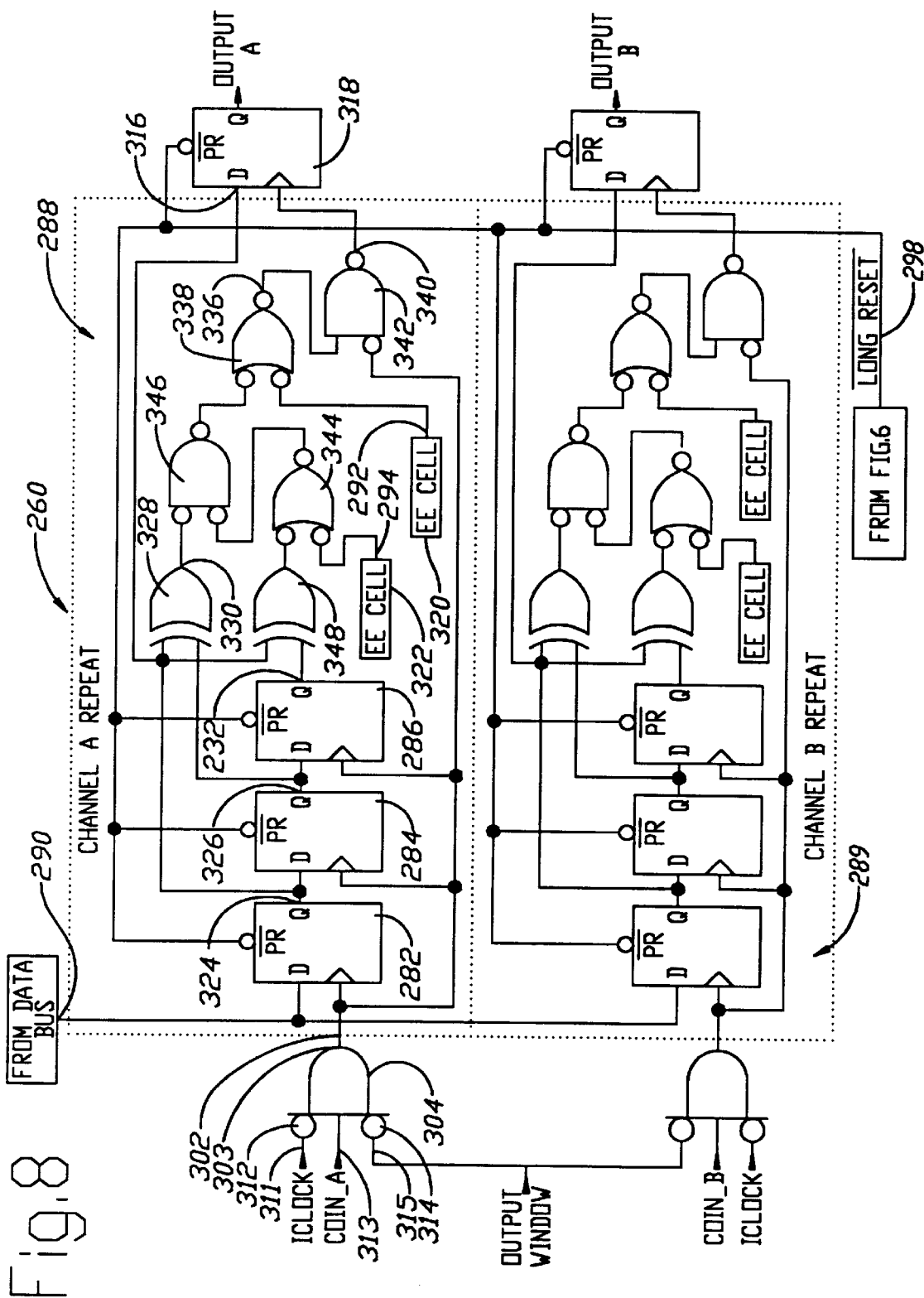
FIG. 8 is a logic circuit diagram of the selectable Data Verifier functional block of FIGS. 2A and 2B.

Referring to FIG. 8, the repeat circuit, or data verifier, 260 shown in block form in FIG. 2A has a channel A data verifier 288 and a channel B data verifier 289 which is substantially identical to the channel A data verifier. In order to avoid erroneous responses to random noise which may be present on the data bus 46 during a selected time slot 65 and 67 associated with one of the modules 32, the data verifier 260 selectively requires a repetition of the same data signal 87 on the data bus 46 during the time slot 65 and 67 associated with the data link module 32 for a selected plurality of successively contiguous time frames 62, 62' and 62'', FIG. 21. Only after said repetition will the appropriate channel A or channel B output signal change in response to the data signals 87 on the data bus 46. Still referring to FIG. 8, the channel A data verifier 288 includes a plurality of binary data flip-flops 282, 284 and 286 interconnected to form a multistage shift register. Each of the data flip-flops 282, 284 and 286 stores the signal 87 present on the data bus 46 during each one of a plurality of successive time frames 62, 62' and 62'', FIG. 21. The input terminals 290, 292, 294, and 298, FIG. 8, of the channel A data verifier receive the signals from the data bus 46, from a pair of electrically erasable read only memories, or EE cells, 320 and 322 of an EEPROM 354, and from the clock loss circuit 240, respectively. Input terminal 296 of the channel A data verifier receives an enabling clock pulse 302 produced on the output 303 of an AND gate 304. The AND gate 304 has three inputs 311, 313, and 315 for receiving ICLOCK, COIN_A and OUTPUT_WINDOW signals, respectively. The selected mode of operation, mode 1 or mode 2, determines the nature and timing of these signals.

In mode 1, there is one clock cycle 61 per time slot 65. The OUTPUT_WINDOW signal is continuously low, and an inverter 312 at input 311 permits the 3-input AND gate 304 to be continuously enabled. Another inverter 314 at input 315 inverts the ICLOCK signal 192 to enable the three-input AND gate 310 during only the second half of the clock cycle 61 when ICLOCK is low. The COIN_A signal is high only during the occurrence of the selected time slot 65 associated with the data link module 32. The edge sensitive data flip-flops 282, 284 and 286 are enabled when COIN_A transitions from low to high. The data flip-flops 282, 284 and 286 are enabled during, and only during, the selected time slot 65 associated with the data link module 32.

In mode 2, there are two clock cycles 67 and 67' per time slot 67. In mode 2, during the first clock cycle 61, the OUTPUT_WINDOW signal is high and during the second clock 61' cycle the OUTPUT_WINDOW signal is low. Therefore, the three-input AND gate 304 is activated only during the second 61' of the two clock cycles 67 and 67'. In other respects, the data verifier 260 works the same in mode two as it does in mode one.

The enabling clock pulse 302 enables each of the three data flip-flops 282, 284 and 286 during the time slot, one of 65 and 67, associated with channel A of the data link module 32, but within successive frames 62, 62' and 62", FIG. 21. Initially, the data flip-flops 282, 286 and 288 are preset by a LONG_RESET signal from the circuit of FIG. 6. Thereafter, upon the first occurrence of the time slot 61 of channel A of the data link module 32, the data signal on the data bus will appear at the Q output 324 of the first flip-flop 282 and also at the D input 316 of a repeat circuit output flip-flop 318. The signal 87 on the data bus 46 during the most recent frame, one of 62, 62' and 62", will always be reproduced at the D input 316 of the repeat circuit output flip-flop 318, but the repeat circuit output flip-flop 318 will be enabled only upon the occurrence of the enabling clock pulse 302 from output 303 of AND gate 304. The occurrence of the enabling clock pulse 302 at the repeat circuit output flip-flop 318 is controlled by programming.

When the EE cell 320 is programmed to contain a logical zero, an AND gate 338 switches its output 336 to a logical zero, and an output 340 of NAND gate 342 switched high during the second half of each clock cycle 61 to enable the repeat circuit output flip-flop 318, without any repetition of data, at a time one-half of a clock cycle 61 after the activation of the first flip-flop 282. When the EE cell 320 is programmed to contain a logical one and an EE cell 322 is programmed to contain a logical zero, the clock of the output flip-flop 318 will be enabled only if both the first and second flip-flops 282 and 284 have the same Q outputs. The first 282 and second 284 flip-flops will have the same Q output only if the data signal 87 on the data bus 46 has been repeated in the selected time slot, one of 65 and 67, in each of two successive frames 62 and 62'. The Q outputs 324 and 326 of the first and second flip-flops 282 and 284, respectively, are fed into an exclusive-OR gate 328.

The signal produced on the output 330 of the exclusive OR gate 328, in combination with the signal produced on the output of a NOR gate 344 and a NAND gate 346 and the state of the EE cells 320 and 322 will cause the repeat circuit output flip-flop 318 to be enabled immediately after (i.e. one-half clock cycle 61 after) a frame 62' having a second consecutive repetition of data signals 87.

When both EE cells 320 and 322 are programmed to contain a logical one, the clocking pin of the repeat circuit output flip-flop 318 is enabled immediately after (one-half clock cycle 61 after) a third frame 62", only if the first, second and third flip-flops have the same signals on their Q outputs 324, 326 and 332, respectively. The signal on output 232 of flip-flop 286 is fed into an exclusive-OR gate 348 along with the signal on output 324 of flip-flop 282. The signal on output 349 of gate 348 is low only when there is an identity of data between the first 62 and third frames 62".

Table 1 summarizes the effect on the data verifier of programming EE cells 320 and 322.

TABLE 1

| EE CELL | 320 | 322 |
| --- | --- | --- |
| No Repetitions | 0 | 0 or 1 |
| One Repetition | 1 | 0 |
| Two Repetitions | 1 | 1 |

In a similar manner, if needed, the data verifier 260 is extended to recognize and selectively respond to more than a minimum of three occurrences of the same data signals 87 on consecutive frames 62 by adding more flip-flops and more EE cells and their associated programmable logic circuitry.

Polarity Selector Circuit

Figure 9:
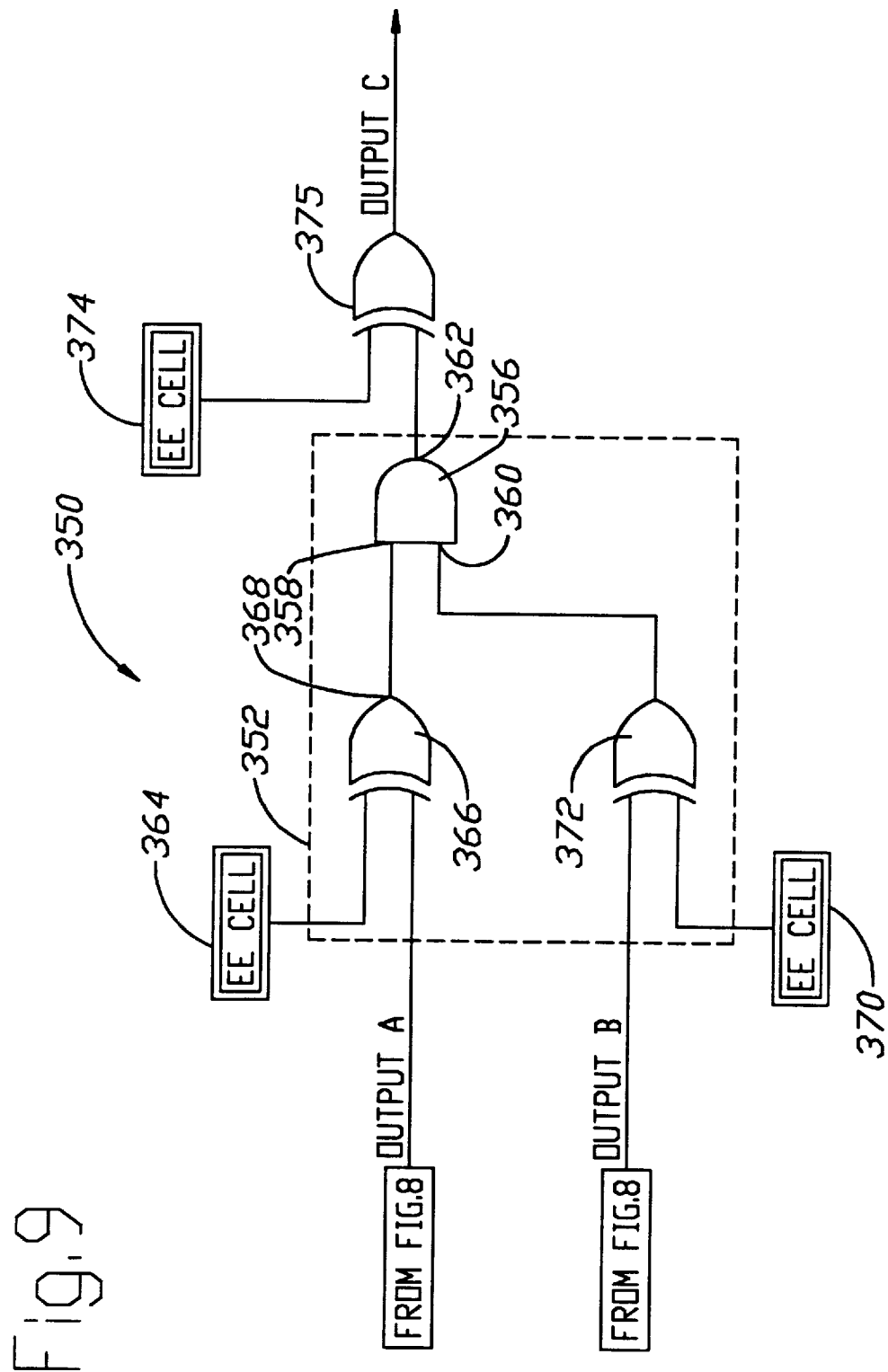
FIG. 9 is a logic circuit diagram of the Polarity Independent functional block diagram of FIGS. 2A and 2B.

In order to overcome the deficiencies of the C output terminal of known data link modules, the data link module 32 has a combinational logic circuit polarity selector 350, shown in block form in FIG. 2B, comprising a polarity independent circuit 352, FIG. 9. The polarity independent circuit 352 receives the A_OUTPUT signal and the B_OUTPUT signal from the data verifier 260 and also receives polarity selection information from the EEPROM 354. As shown in detail in FIG. 9, the polarity independent circuit 352 includes an AND gate 356 having two input terminals 358 and 360 for receiving the A_OUTPUT and B_OUTPUT signals and having an output terminal 362 for producing a C_OUTPUT signal. Unlike known data link modules, the polarities of the input signals to the AND gate 356 of the invention are not restricted to being the same as the polarities of the A_OUTPUT and B_OUTPUT signals. The polarity of each input to the AND gate 356 can be individually, selectively changed from the polarities of the A_OUTPUT and B_OUTPUT signals. Polarity selection information from one of the EE cells 364 and the A_OUTPUT signal are fed into an exclusive-OR gate 366. The output 368 of the exclusive-OR gate produces the A_OUTPUT signal but with a polarity selectively different than its input polarity. Similarly, the B-OUTPUT signal and a second EE cell 370 is fed through another exclusive-OR gate 372. The polarity of the output of the AND gate 356 is selectively controlled by a third EE cell 374 and an exclusive-OR gate 375 thereby allowing C_OUTPUT signal to be any logical combinational function of the A_OUTPUT signal and B_OUTPUT signal.

Input Synchronizer

Referring now to FIG. 2A, the integrated circuit 80 has input data control circuits 182 and 184 to isolate subsequent portions of the integrated circuit from changes in channel A and channel B input signals occurring during a time slot 65 associated with a data link module 32. The channel A input data control circuit 182 is substantially identical to the channel B input data control circuit 184, therefore only the channel A input data control circuit will be described in detail. The channel A input data control circuit 182 has COIN_A, IINPUT_A, INPUT_WINDOW, and INPUT_INHIBIT signals as inputs and a INPUT_DATA_A signal as an output. As shown in more detail in FIG. 5, the input data control circuit 182 has a data flip-flop 400 and a three-input AND gate 402. The IINPUT_A signal is fed into the D input 404 of the data flip-flop 400 which is enabled by the COIN__A signal only at the beginning of the time slot 65 associated with the data link module 32. The COIN__A signal is normally low and goes high only during the address associated with the data link module 32. The data flip-flop 400 is edge sensitive. At the rising edge of the COIN__A signal the state of the IINPUT__A signal is latched onto a Q output 406 of the flip-flop 400 for the duration of the time slot 65 of the data link module 32. The Q output 406 is fed into the three-input AND gate 402 along with COIN__A and INPUT__WINDOW. In mode one, INPUT__WINDOW is continuously low and the inverter 408 at one of the inputs 410 of the AND gate 402 allows the AND gate to be enabled by INPUT__WINDOW. During the time slot 65 of the data link module 32, COIN__A is high and the AND gate 402 is enabled by COIN__A during the module's time slot. Therefore, in mode one, the IINPUT__A signal appears at the output terminal 412 of the AND gate 402 only during the time slot 65 of the data link module 32. Referring now to the timing diagram, FIGS. 17C and 17D, in mode two, each time slot 67 is twice as long as each time slot 65 in mode one, but only the first half of each mode two time slot 67 is dedicated to applying input signals to the data bus 46. In mode two, INPUT__WINDOW operates at half the frequency of the master clock signal 85. In mode two, INPUT__WINDOW is low during the first half of the time slot 67 and high during the second half of the time slot. Referring again to FIG. 5, the inverter 408 on the input 410 to the AND gate 402 allows the AND gate to be enabled only during the first half of the time slot 67 of the data link module 32. Therefore, in mode 2, the IINPUT__A signal appears at the output 412 of the AND gate 402 only during the first half of the time slot 67 of the data link module 32. The output 412 of the AND gate 402 forms the output terminal 414 of the input data control circuit 182 at which is produced the signal INPUT__DATA__A. The INPUT__DATA__A signal is fed to the data bus drive circuit 420.

Mode Selection Indicator

Figure 15:
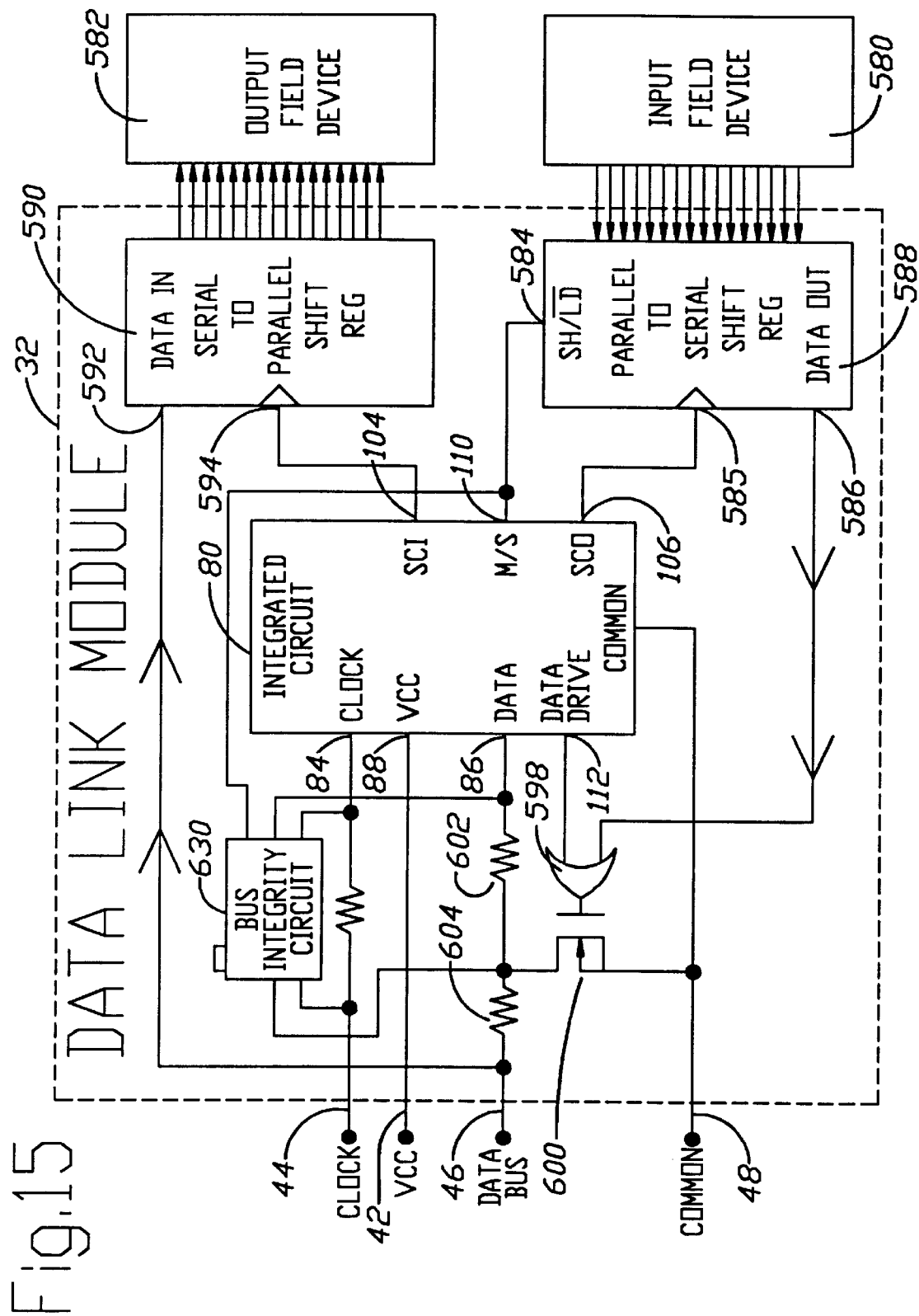
FIG. 15 is a simplified block diagram of a data link module of FIG. 1 used as an output module, showing multiplexing.

Referring now to FIG. 15, in order to synchronize the operation of other components, such as shift registers 588 and 590, on the data link module 32 with the operation of the integrated circuit 80 and in order to inform the other components on the module of the mode of operation, the integrated circuit has a single terminal 110 for alternately conveying a SYNC signal 196 and a MODE signal 488. As shown in block form in FIG. 2B, the combined MODE/SYNC signal 456 is generated by a mode/sync output circuit 458. The mode/sync output circuit 458 has four input terminals for receipt of MODE 488, SYNC 196, OSC 136, and POR__DLY 198 as input signals and one output terminal 468 for producing the combined MODE/SYNC as an output signal 456. Advantageously, the MODE/SYNC signal 456 is independent of the channel A and channel B input signals, and of the data signals 87 on the data bus 46. The MODE/SYNC output terminal 468 periodically produces a SYNC output signal 196 whenever the integrated circuit 80 has operating power, except for a short period of time immediately after start up due to a low POR__DLY signal. Of course, there can be no sync information on the MODE/SYNC output terminal 468 if the integrated circuit 80 loses the master clock signal 85, but the mode information will remain on the MODE/SYNC output terminal 468 in such an event.

Figure 10:
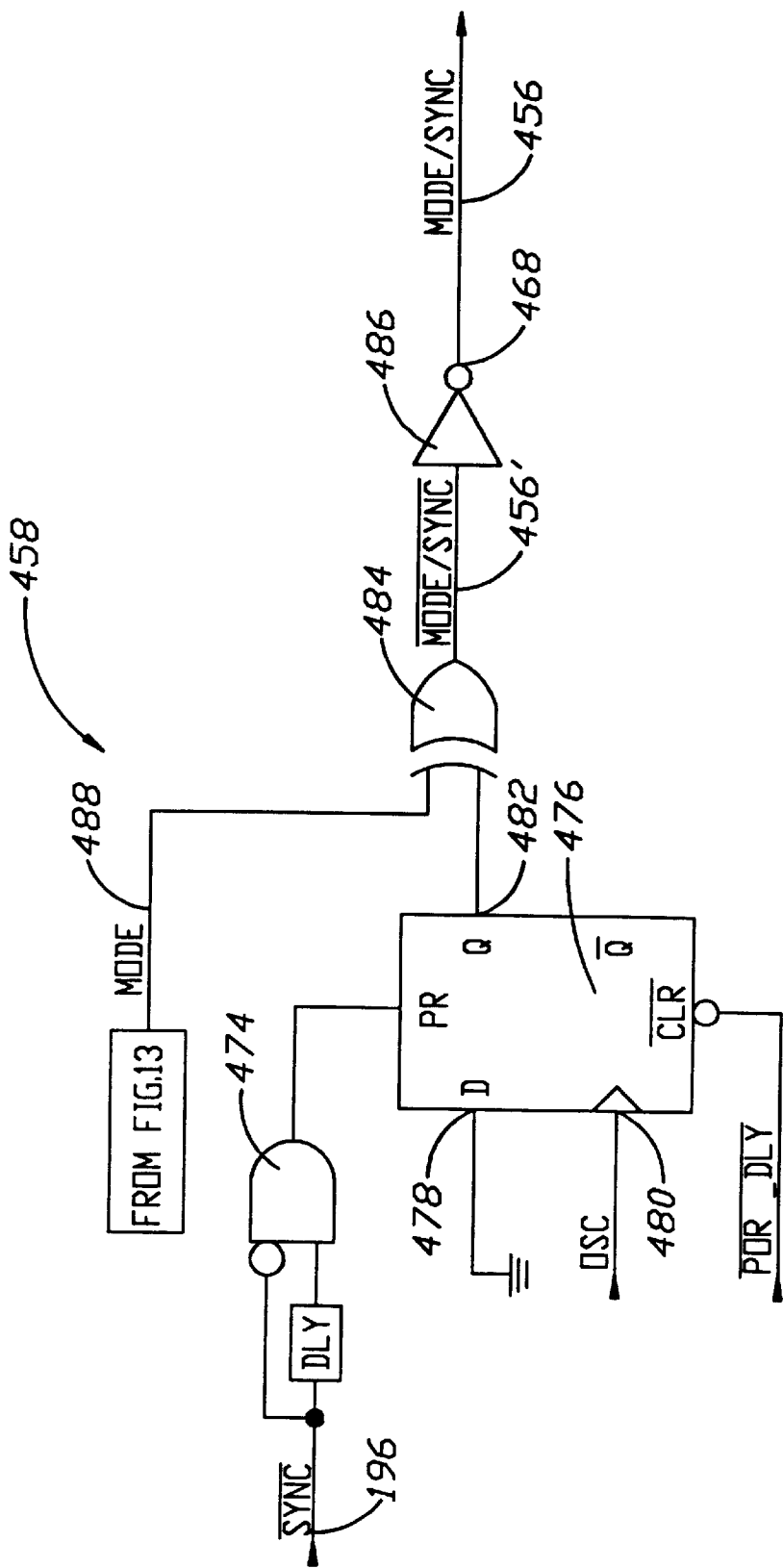
FIG. 10 is a logic circuit diagram of the Mode/Sync Output functional block of FIGS. 2A and 2B.

The mode/sync output circuit 458 is shown in more detail in FIG. 10. The low POR__DLY clears a data flip-flop 476. An inverted SYNC signal 196 and a delayed SYNC signal 196 are fed into an AND gate 474 to produce a positive short duration pulse on a transition when SYNC falls low. The short duration pulse presets the data flip-flop 476. A D input 478 of the flip-flop 476 is continuously at ground potential. The OSC signal 136 is fed into the clocking input 480 of the flip-flop 476. Therefore, the Q output 482 of the flip-flop 476 is normally low but it is preset high by the short duration pulse at the beginning of every frame. However, the output Q 482 of the flip-flop 476 remains high for only one cycle of OSC 136 and then it returns low. The Q output 482 of the flip-flop 476 goes into an exclusive-OR gate 484 along with the MODE signal 488. The MODE signal reflects the mode selected and stored in the EEPROM 354 during programming. In mode one, MODE=0 and the exclusive-OR gate 484 effectively inverts the Q output 482 of the flip-flop 476. In mode two, MODE=1 and the exclusive-OR gate 484 does not change the Q output 482 of the flip-flop 476. An inverter/buffer 486 inverts theMODE /SYNC signal 456', regardless of mode, prior to the MODE/SYNC signal 456 appearing on the MODE/SYNC output terminal 110 of the integrated circuit 80. As shown on the timing diagram, FIGS. 17A and 17B, in mode one, MODE/SYNC 456 is continuously low, except that it goes high for one cycle of OSC 136 at the beginning of each frame 62. In mode two, MODE/SYNC 456 is continuously high, except that it goes low for one cycle of OSC 136 at the beginning of each frame 62.

Multiplexing Frame Identifier

Referring now to FIG. 21, multiplexing of frames 62 allows a successive frame 62' to convey different data than the data conveyed by a preceding frame 62. Referring now to FIG. 2A, the integrated circuit 80 has a multiplex clock circuit 490 for generating a multiplex clock signal 492 needed to multiplex frames 62. The integrated circuit 80 also provides an output terminal 108 so that the multiplex clock signal (MUX__CLK) 492 could be accessed by relatively few and relatively simple external components on the data link module 32. This feature overcomes one of the disadvantages of the prior out, which required similar signals to be generated by additional external and delicate components.

Figure 16:
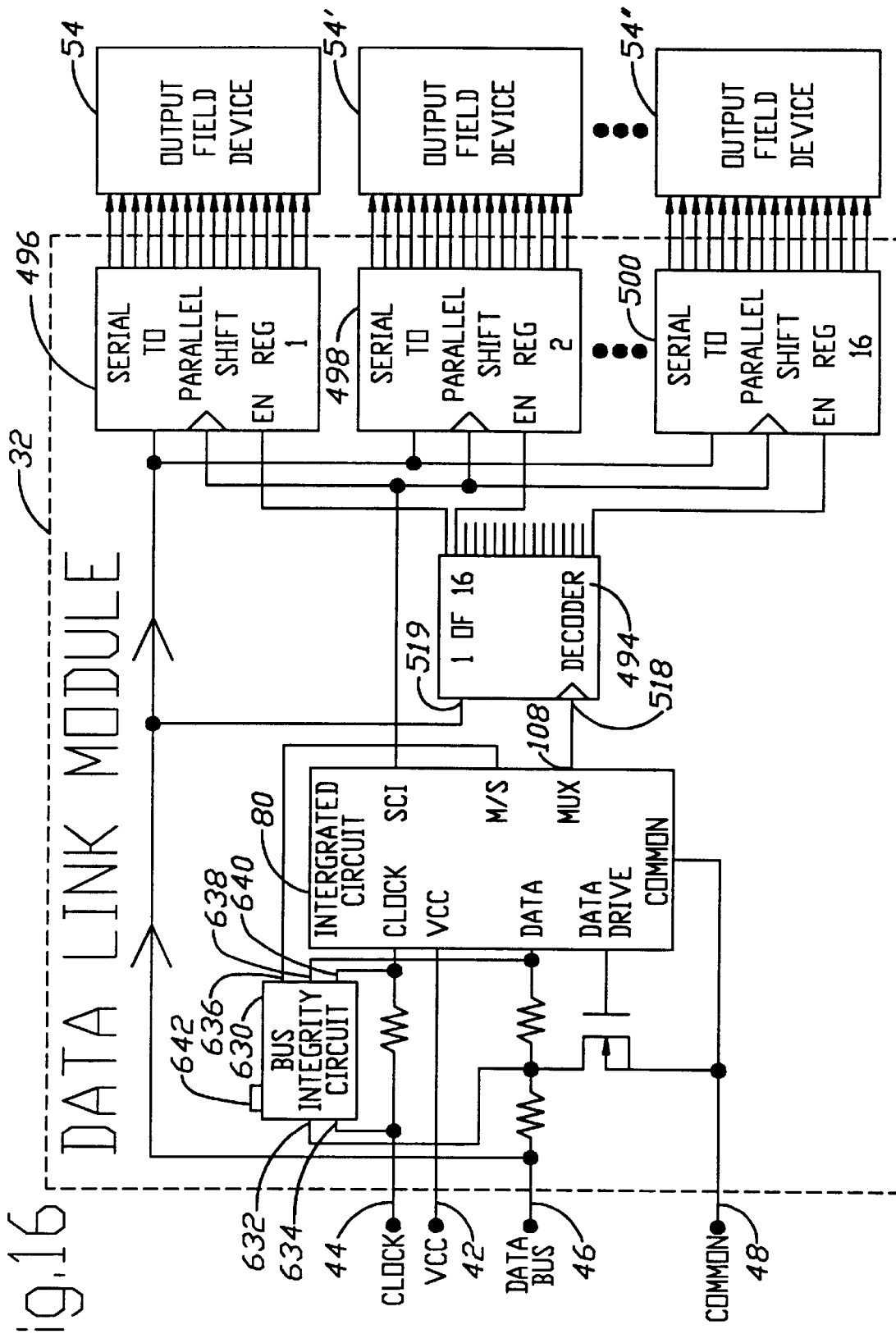
FIG. 16 is a simplified block diagram of a data link module showing a Data Bus Integrity Checker, the data link module integrated circuit and two 16-bit shift registers for 16-bit word addressing.

Referring now to FIG. 16, integrated circuit 80 has a multiplex address clock output terminal 108 for use by a decoder 494 on the data link module 32 for selectively enabling a plurality of shift registers 496, 498 and 500. Each of the plurality of shift registers 496, 498 and 500 transfers data from the data bus 46 to an associated output field device 54, 54', 54" during the same time slots 65 but within different frames 62. The use of the MUX__CLK signal 492 permits time division multiplexing of frames 62. When time division multiplexing is done, each frame 62 is given a frame number. Time slots 1–4, inclusive, are used to number each frame 62. Time slot 0 is not used in frame multiplexing. The master clock module 36, FIG. 1, places the frame number on each frame 62 by putting a series of four signals, representative of the frame number, on the data bus during time slots 1–4 of each frame. Because four bits are used to assign frame numbers, up to sixteen different numbers can be assigned to frames. The multiplexing of 16 frames allows for the serial transmission of up to 3,840 bits of data (16×240 bits per frame). Although the present embodiment uses four time slots for multiplexing up to 15 frames, it is possible to use up to sixteen time slots for multiplexing up to 32,768 frames to convey up to 7,864,320 bits of data (32,768×240 bits per frame).

As shown in block form in FIG. 2A, the multiplex clock circuit 490 has eight parallel input terminals 501–508 for acceptance of eight-bit frame addresses, and terminals 509, 510 and 511 for acceptance of SYNC, ICLOCK and OUTPUT_WINDOW signals, respectively. The circuit has one output terminal 513 for outputting a multiplex clock (MUX_CLK) signal 492.

Figure 11:
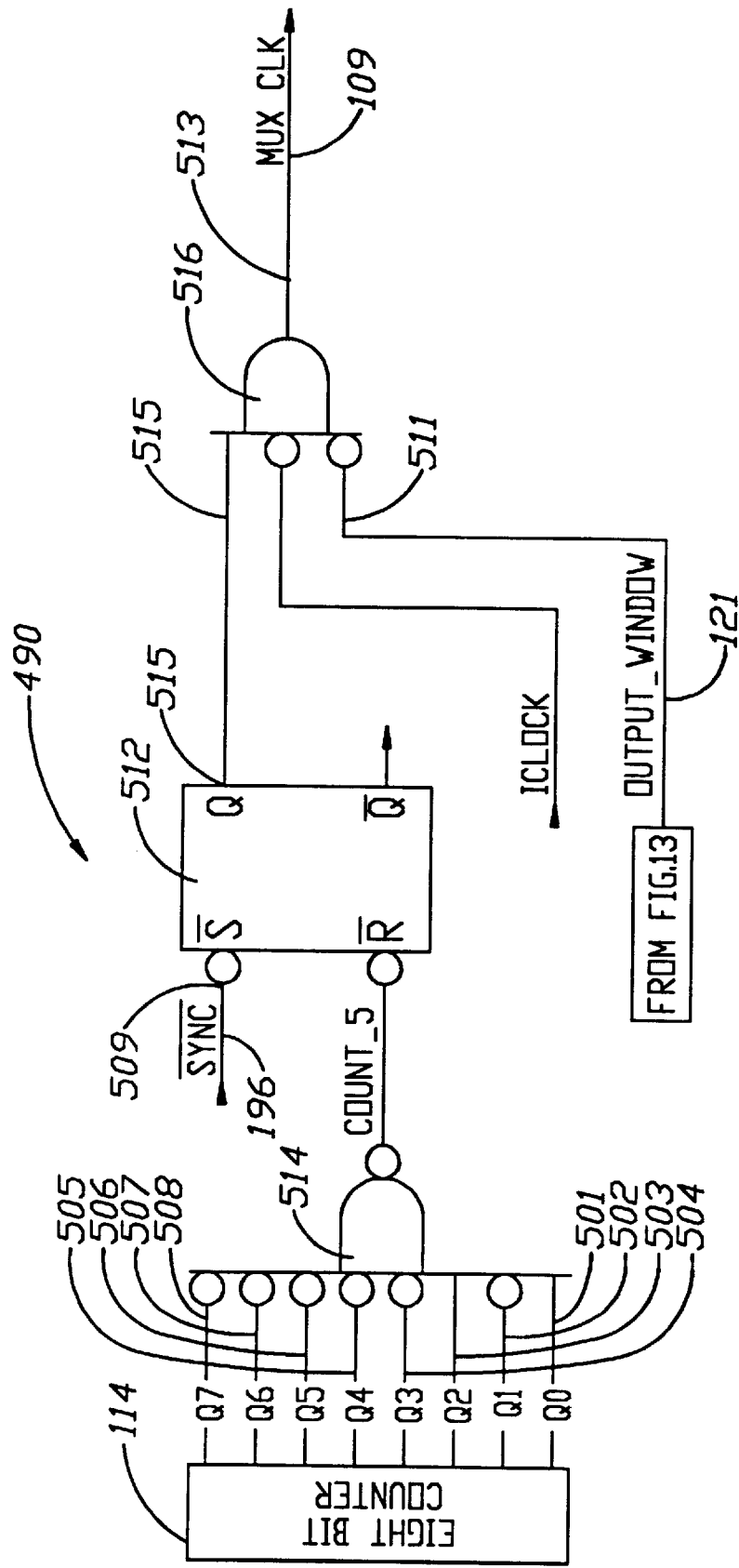
FIG. 11 is a logic circuit diagram of the multiplex address clock, or MUX CLOCK, functional block of the data link module of FIGS. 2A and 2B.

As shown in more detail in FIG. 11, the multiplex clock circuit 490 includes an eight-input 501–508 NAND gate 514 with six inputs having inverters for detecting a frame 62 having a frame number 00000101=5. The NAND gate 514 produces a COUNT_5 signal which is normally high but which is low for one master clock cycle 61 after detecting the frame with the frame number five.

The SYNC signal 196 sets an RS flip-flop 512 at the beginning of each frame 62 which produces a high output at Q 515 which, in turn, enables a three-input AND gate 516. In mode one, the OUTPUT_WINDOW signal 121 is continuously low and also enables the three-input AND gate 516. The combination of the SYNC 196 and OUTPUT_WINDOW 121 signals enables ICLOCK 192 to be reproduced at the output terminal 513 of the multiplex clock circuit 490 until the fifth frame is counted by counter 114. When the fifth frame is counted a COUNT_5 signal is produced by NAND gate 514, and flip-flop 512 is reset. The output Q of flip-flop 512 becomes zero thereby disenabling the three-input AND gate 516 after counter 114 counts five frames 62. After the fifth frame 62, no MUX_CLK signal 492 is produced.

In mode two, the multiplex clock circuit 490 works similar except that OUTPUT_WINDOW 121 is a clocking signal operating at half the frequency of ICLOCK 192 and in phase with ICLOCK. In mode two, the three-input AND gate 516 enables ICLOCK 192 to pass through to the multiplex clock output terminal 513 only when both OUTPUT_WINDOW and ICLOCK are both negative. As shown on the timing diagram, FIG. 17C, in mode two, MUX_CLK 492' is a train of positive and negative pulses of dissimilar width.

As shown in FIG. 16, the MUX_CLK signal 492 is fed into an input 518 of the decoder 494. The data bus is connected to another input 519 of the decoder 494. The MUX_CLK signal 492 allows the decoder 494 to serially receive the frame numbers from the data bus 46 during time slots 1–4. The output of the decoder 494 has up to 16 individual lines for successively enabling one of each of the shift registers 496, 498 and 500 during the frame 62 associated with each shift register.

Programming

The logic circuits of the integrated circuit 80 operate on a preselected internal DC voltage, preferably approximate 9 volts. As shown in block form in FIG. 2B, the integrated circuit 80 has a voltage regulator 520 that accepts an input DC voltage $V_{cc}$ from 12 to 32 volts and produces the internal DC operating voltage V or $V_{ref}$ of approximately 9 volts. The voltage regulator 520 is one of several known types and forms no part of the invention. The signal passing circuitry of the integrated circuit 80 is activated for passing signals through the data link module 32 when $V_{cc}$ is within one of two voltage ranges. Preferably the two ranges are approximately 12–15 volts and approximately 18–32 volts. The DC input voltage $V_{cc}$ and the reference voltage $V_{ref}$ are fed into a module programmer 232 shown in block form in FIG. 2B. The other input signals fed into the module programmer are POR, IDATA, ICLOCK, LONG_RST, ÷2ICLOCK and input signals from the EEPROM 354. The output signals from the module programmer are a program voltage enable signal (PVE), a program/verify mode signal (P/V_MODE), a program/verify data signal (P/V_DATA) and output signals to the EEPROM 354.

Figure 12:
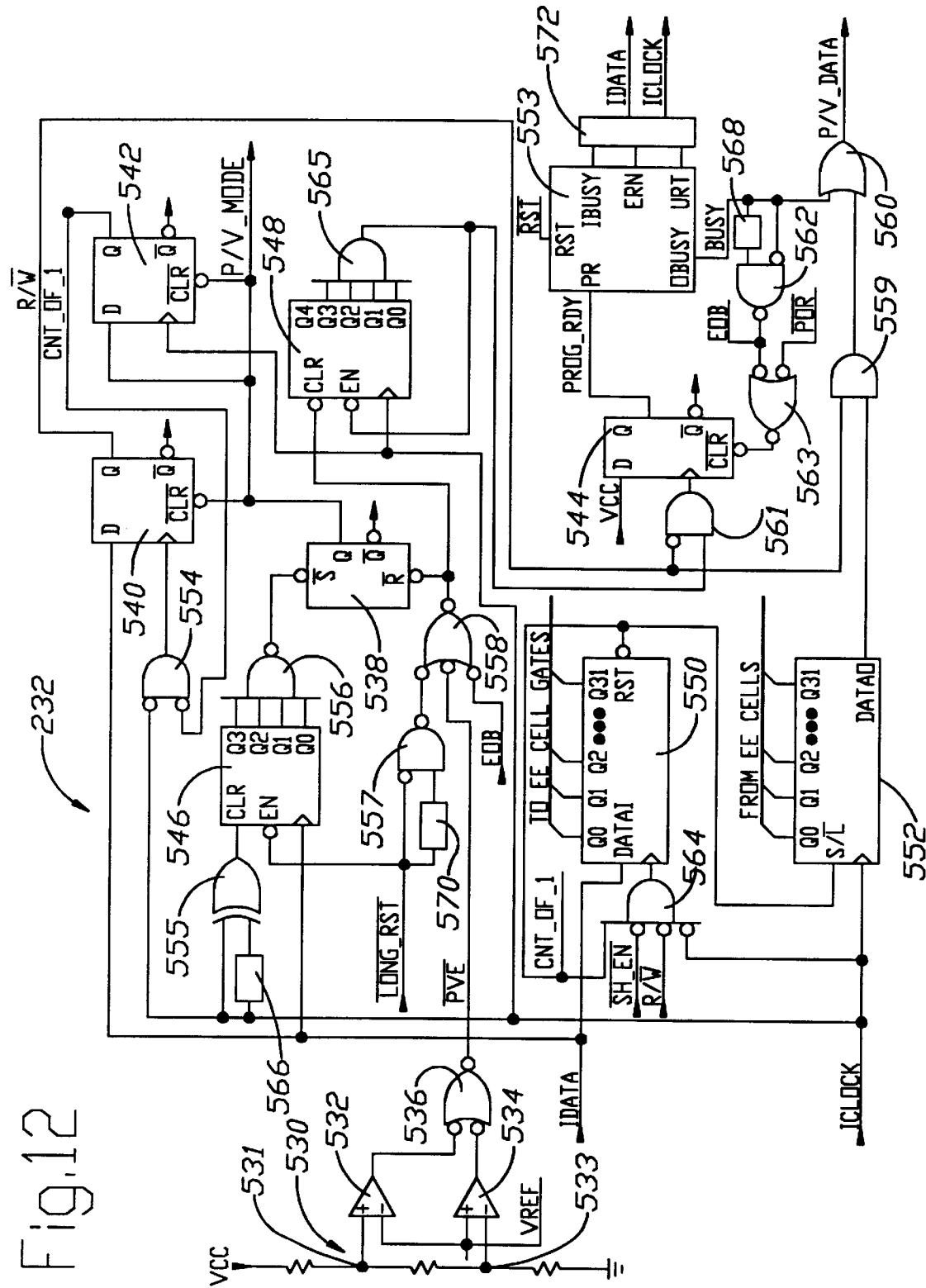
FIG. 12 is a logic circuit diagram of the Program Control functional block of FIGS. 2A and 2B.

The module programmer 232 is shown in more detail in FIG. 12. The module programmer has a program enabler including a voltage divider 530 having three resistors for producing two voltages intermediate $V_{cc}$ and ground. One of the two intermediate voltages is fed into a positive input 531 of a voltage comparator 532 having as its other input $V_{ref}$. The other of the two intermediate voltages is fed into a negative input 533 of another voltage comparator 534 having as its other input $V_{ref}$. When $V_{cc}$ is between approximately 15.5–17.5 volts, the outputs of each voltage comparator 532 and 534 is high and a high PVE signal is produced at the output of an AND gate 536. The module programmer also includes four flip-flops 538, 540, 542 and 544, a four bit counter 546, a five bit counter 548, a serial-to-parallel converter 550, a parallel to serial converter 552, a state machine 553 and at least eleven logic gates 554–565 described in more detail hereinafter. The four bit counter 546 is enabled by a low LONG_RST (which indicates no clock signal transitions) and it counts 15 transitions of the data line while $V_{cc}$ is between 15.5 and 17.5 volts. The four bit counter 546 is cleared by any transition of the clock signal detected by a delay element 566 and an exclusive-OR gate 555. The four bit output of the counter 546 is AND'd together by gate 556 to set a flip-flop 538. The flip-flop 538 is normally in a reset state except when the integrated circuit 80 is to be programmed or the programming is to be verified in which case the flip-flop is set by the output of the four-bit counter 546. The normally high LONG_RST is fed into a delay element 570 and a gate 557 whose output is momentarily low on any negative-going transition of LONG_RST and the output is fed into a three-input AND gate 558. The other inputs to the three-input AND gate 558 are PVE (a high PVE is an indication that the integrated circuit 80 is ready for programming) and an end of busy (EOB) signal. The LONG_RST signal is required to be high prior to programming. However, the momentary low on the LONG_RST input will cause the flip-flop 538 to reset thereby preventing programming. When the three inputs to the AND gate 558 are high, the reset signal to the flip-flop 538 is removed and one of the preliminary steps prior to programming is completed. Receipt of fifteen pulses on the data line 46 is also required to cause the integrated circuit 80 to become ready for programming. Upon receipt of the fifteen pulses, the four bit counter 546 produces an output to set the flip-flop 538. The Q output of the flip-flop 538 is designated a PV_MODE signal. As shown on the timing diagram, FIG. 18A, the P/V_MODE signal from FF1 538 transitions from low to high at this point 539. A high PV_MODE is indicative of programming or verifying in progress. A low output Q of the flip-flop 538 clears a second flip-flop 540.

The programming data is shifted into the data link module integrated circuit 80 of the data link module 32 by using the clock line 44 and data bus 46. As shown in the timing diagram of FIG. 18A–18C, the data stream contains a program/verify (P/V) bit and 32 data bits. The first bit is the P/V bit. The P/V bit is low for programming; the P/V bit is high for verifying. Flip-flop 540 is enabled by ICLOCK and is set when the first programming bit is high. The first 16 bits contain the addresses for channel A and B (eight bits each). The next 16 bits contain the control functions including output A to C polarity, output B to C polarity, mode selection, channel A repeat once, channel A repeat twice, channel B repeat once, channel B repeat twice, and input A/B high select. The positive true data is placed on the data line at the beginning of the clock cycle (the positive going edge) and is transferred to the integrated circuit at 180° (negative going edge) of the clock cycle. If the P/V bit is high, the next 32 clock cycles will shift the programmed data to the data line. A third flip-flop 542 generates a COUNT_OF_ONE signal which enables the five-bit counter 548 to count to 32 which is the number of programming bits. The third flip-flop 542 also enables a serial-to-parallel converter 550 which receives serial data from the data bus during programming, that is, when R/W is low and SH_EN is low. Data from EE cells (not shown) of the EEPROM 354 is returned to a parallel-to-serial converter 552 for extraction from the integrated circuit 80 via an AND gate 559 and an output OR gate 560 during verification of programming. When the Q output of the second flip-flop 540 is low, an AND gate 561 is enabled and the EE cells are written to. When the Q output of the second flip-flop 540 is high, AND gate 559 is enabled and the EE cells are read. The output of the AND gate 559 is fed into OR gate 560 for outputting data to the data drive circuit 420 shown in FIG. 14. A five-bit counter 548 counts 32 clock cycles thereby enabling AND gate 565 which, in turn, enables gate 561. When the AND gate 561 is enabled, it provides timing to a fourth flip-flop 544 for use in a state machine 553. The output of the fourth flip-flop 544 provides a program ready signal (PROG_RDY) to the state machine 553. As shown in the timing diagram, FIG. 18C, the PROG_RDY signal goes high during the electrically erasable program cycle 574. The state machine 553 controls the burning in of the EE cells through a programming control logic circuit 572. The state machine 553 has an output OBUSY that clears flip-flop 544 through gates 562 and 563 and delay element 568. Each data bit will be placed on the data line 46 at the beginning of each clock cycle where it can be read by a programmer. This data is negative true.

The programming supply voltage at the integrated circuit 80 must be 16.5 Vdc±1.0 Vdc. Preferably, a buffer resister of 300 Ω (not shown) is used between the bus and the integrated circuit 80. The voltage loss across this resistor is approximately 0.4 Vdc. The supply voltage compensates for this loss.

The voltage levels for the two control lines (clock line 44 and data line 46) swings between bus common and the internal operating voltage V of the integrated circuit 80. This voltage is preferably nine volts. A 100k Ω resistor (not shown) is part of each input filter 188 and 186 for the clock lines 44 and data line 46, respectively. These resistors are also used for input protection for the integrated circuit 80. This will allow an input signal of several hundred volts without damaging the integrated circuit 80 or causing improper operation. To make the programmer clock and data signals compatible with the prior art data link module described in the aforesaid patent of Riley, a 12 volt signal is used. During programming, the clock frequency is between 25 kHz and 30 kHz. The clock frequency is used for timing reference in writing to the EEPROM 354.

As shown in the timing diagram for the program cycle, FIG. 18C, after the data has been shifted into the integrated circuit 80, the electrically erasable programming cycle 574 requires 2 cycles of 200 ms each. The first cycle is an erase cycle, the second cycle is the programming of the EEPROM 354. The output of the four-input AND gate 564 is fed into the enabling clock input of the serial-to-parallel converter 550. The programming time for each integrated circuit 80 is approximately 500 ms.

The method of programming the data link module over the data bus line 46 and the master clock line 44 includes: Step one, removing the power from the data link module 32. Step two, applying 15.5 to 17.5 volts direct current to the $V_{cc}$ terminal of the data link module 32. Step three, waiting a preselected time for the power on reset circuit 190 to produce a low POR signal. Step four, holding the CLOCK signal high for a preselected interval of time, 70 FIG. 18A, preferably for at least 5 μsec, and then, while continuing to hold the CLOCK signal high, simultaneously transitioning the data line fifteen times between high and low. Step five, applying the master clock signal 85 to the master clock terminal 84 of the data link module 32 and waiting for a preselected number of cycles of OSC in order for LONG_RESET to go high. Step six, sending a logical high P/V bit 578, FIG. 18B, over the data line 46. Step seven, sending 32 bits of programming data over the data line 46. Step eight, waiting a preselected time for the state machine 553 and the programming control logic circuit 572 to "burn" the programmed bits into the respective cells of the EEPROM 354. The details of the state machine 553 and programming control logic circuit 572 are well known in the art and form no part of the invention. Step nine, applying direct current to the $V_{cc}$ terminal at a voltage above 17.5 volts or below 15.5 volts. Step ten, operating the data link module 32 in accordance with the programming. Between step six and step seven the person programming the module programmer 232 has the advantageous option of pausing an indefinite time interval to prepare for the actual programming. This time interval is shown in the timing diagram, FIGS. 18A and 18B as interval 576. The actual programming is preferably accomplished by means of a hand-held programming device, the details of which are well known and form no part of the invention. The aforementioned steps assure that the data link module is not inadvertently programmed by noise on the data line 46.

Figures 18B, 18E:
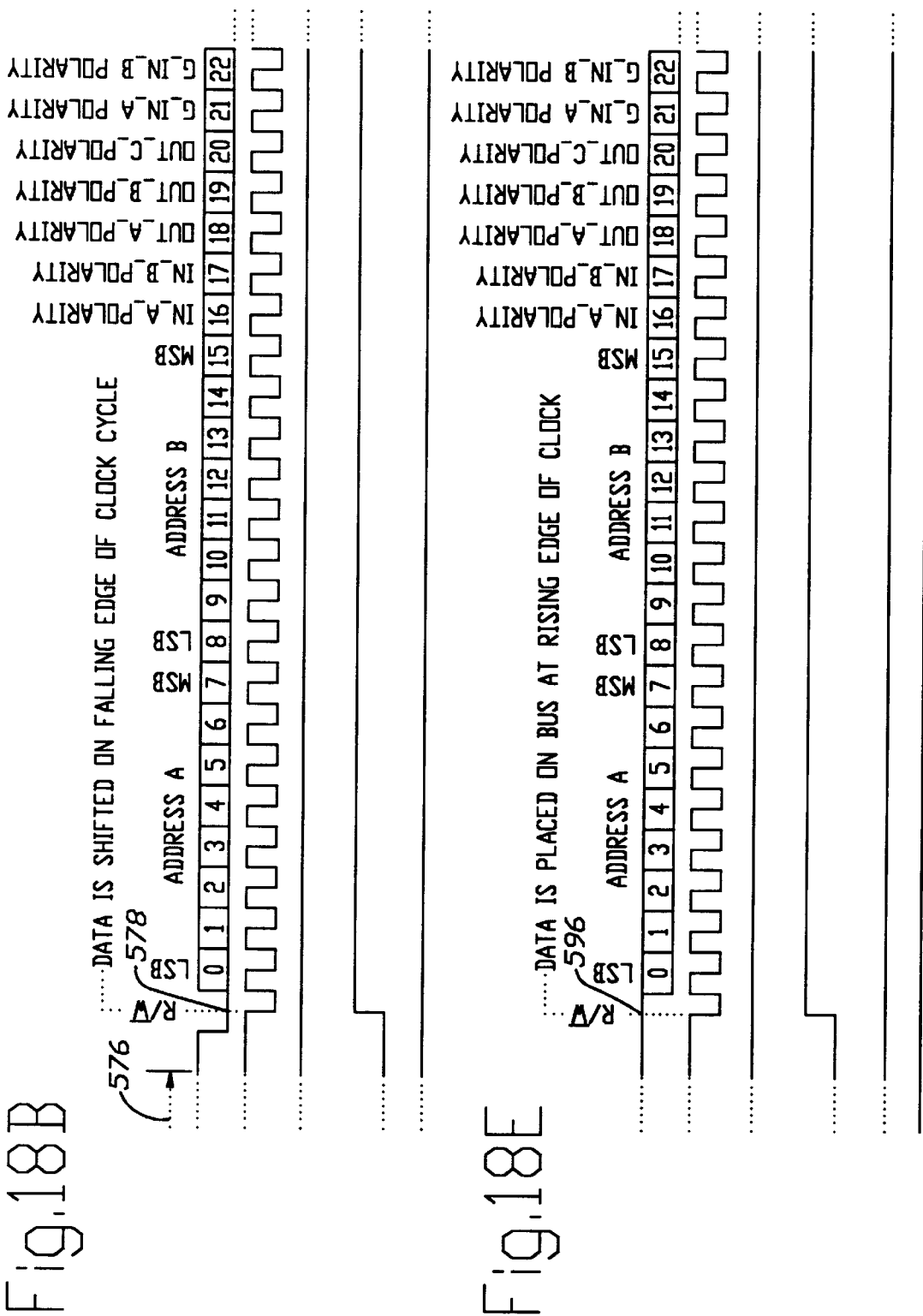

As shown on the timing diagram, FIGS. 18D–18F, the method of verifying the programming of the data link module is similar to the method of programming except as follows. Step six, sending a logical low P/V bit 596, FIG. 18E, over the data line 46. Step seven, receiving 32 bits of programming over the data line 46 via the P/V_DATA line and the DATA_DRIVE output.

Input/Output Word Extenders

Unlike known data link modules, the data link 32 selectively passes either single bits of data or multi-bit words of data, preferably 8-bit to 16-bit words of data, from an input device 50 to the data bus 46 or from the bus to an output device 54. As shown in FIG. 15, the data link module 32 has an integrated circuit 80 and preferably two shift registers 588 and 590. Shift register 588 is preferably a 16-bit parallel-to-serial shift register for parallel receipt of data from a 16-bit input field device 580 and serial transmission of this data onto the data bus 46. Shift register 590 is preferably a serial-to-parallel 16-bit shift register for parallel transfer of data to a 16-bit output field device 582. The data link module 32 shown in FIG. 15 is used either as an input module, as an output module, or, when operated in mode two, concurrently as both an input and output module.

Unlike prior data link module integrated circuits, the data link module 32 includes a shift clock in terminal 104 having on it a reproduction of the master clock signal 85 during a time interval 453, FIGS. 17A–17D, between an address A time slot 422 and an address B time slot 424. In addition, the integrated circuit 80 has a shift clock out 106 terminal having on it, in mode one, an inverted master clock signal 85 during the time interval 453 between the address A time slot 422 and the address B time slot 424. A word extender circuit 430, FIG. 2A, produces a SHIFT_CLK_IN signal and a SHIFT_CLK_OUT signal at output terminals 104 and 106, respectively, of the integrated circuit 80.

Figure 13:
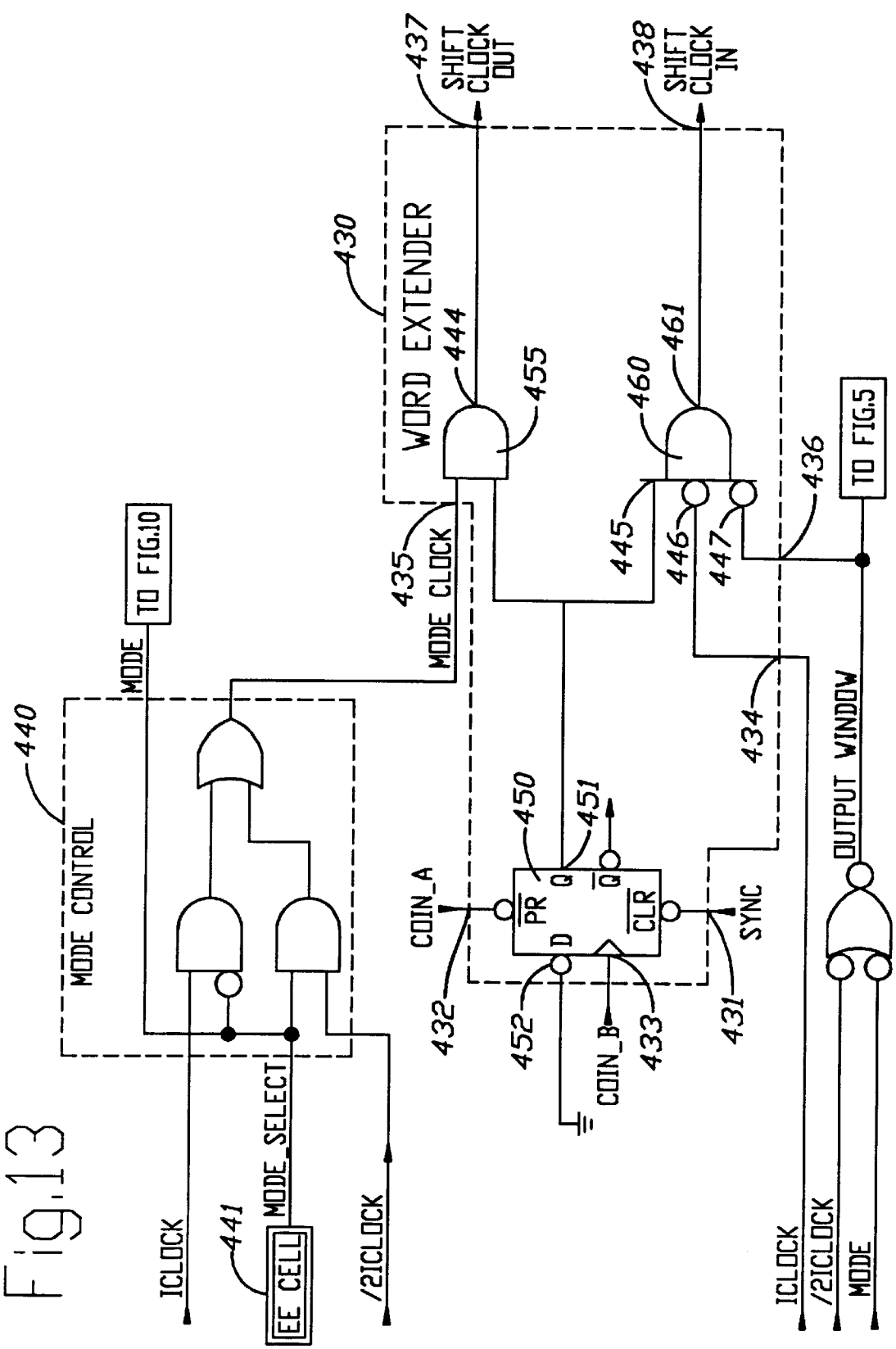
FIG. 13 is a logic circuit diagram of the WORD EXTENDER, the Mode Control and part of the Window Control functional blocks of FIG. 1 to illustrate shift clock in and shift clock out aspects of the present invention.

The word extender 430, shown in more detail in FIG. 13, has six input terminals 431–436 and two output terminals 437 and 438. A mode control circuit 440 generates a MODE_CLK signal which is the ICLOCK signal when EE cell 441 is low and is a ÷2ICLOCK signal when the EE cell 441 is high. The word extender circuit 430 includes a data flip-flop 450 which is cleared by SYNC at the beginning of each frame 62. The flip-flop 450 normally has a low output 451 due to the grounded input 452. The COIN_A signal presets the flip-flop and makes output 451 high. The output 451 remains high until the occurrence of the high COIN_B signal.

The output 451 of the flip-flop 450 is fed into an AND gate 455 along with MODE_CLK. The output 444 of the AND gate 455 produces SHIFT_CLK_OUT and it is a reproduction of ÷2ICLOCK during mode two operation.

The word extender circuit 430 also has a three-input 445–447 AND gate 460. An OUTPUT_WINDOW signal 121 is fed into input 447 of the AND gate 460. The OUTPUT_WINDOW signal is produced by the window control circuit 120 shown in block form in FIG. 2A. FIG. 13 also shows, in detail, a portion of the window control circuit 120 which generates the OUTPUT_WINDOW signal. The OUTPUT_WINDOW signal is always low in mode one operation, thereby continuously enabling AND gate 460. During mode two operation, OUTPUT_WINDOW is low only during the second half of each ÷2ICLOCK cycle, thereby enabling AND gate 460 only during the second half of each ÷2ICLOCK cycle. The ICLOCK signal is fed into input 458 of AND gate 460, thereby enabling the AND gate only during the second half of each ICLOCK cycle. Therefore, during mode two, output 461 of AND gate 460 is a train of positive and negative pulses of dissimilar widths commencing at time slot A 422' and ending at time slot B 424'. The output 461 of AND gate 460 produces the SHIFT_CLK_IN signal. The SHIFT_CLK_IN signal produced during mode two operation is shown in FIGS. 17C and 17D.

Referring again to FIG. 15, output signals from a controlling field device 580 are fed into input terminals of a synchronous parallel-to-serial shift register 588. The mode/sync output terminal 110 of the integrated circuit 80 is connected to the shift high/load (SH/LD) terminal 584 of the parallel-to-serial shift register 588. The sync pulse 196 at the mode/sync output terminal 110 controls the loading of the shift register 588. A shift clock out (SCO) terminal 106 of the integrated circuit 80 is connected to the clocking terminal 585 of the parallel-to-serial shift register 588. The DATA_OUT terminal 586 of the parallel-to-serial shift register 588 is connected to the data bus 46 via an OR gate 598 and an FET 600. Data in the parallel-to-serial shift register 588 is transferred to the data bus 46 on the falling edge of each SCO pulse. The falling edge of each SCO pulse occurs at the beginning of each time slot 65.

The data bus 46 is connected to the DATA_IN terminal 592 of a synchronous serial-to-parallel shift register 590. The synchronous serial-to-parallel shift register 590 is clocked by the shift clock in (SCI) signal inputted at 594 for copying data from the data bus 46 on the falling edge of each SCI pulse. The falling edge of each SCI pulse occurs one half of a master clock cycle 85 after the occurrence of the falling edge of each SCO pulse. The output signals of the serial-to-parallel shift register 590 are fed into input terminals of a field device 582 controlled by the data link module 32.

In mode two, data is copied from the parallel-to-serial shift register 588 to the data bus 46 during the first half of the master clock cycle 85 and data is copied from the bus to the serial-to-parallel shift register 590 during the second half of the clock cycle. As shown on the timing diagram in FIGS. 17C and 17D, in mode two, the SCO signal is an inverted master clock signal 85 and the SCI signal is a pulse train of dissimilar width positive and negative pulses. The dissimilar width pulses are due to OUTPUT_WINDOW being fed into the SCI AND gate 460, FIG. 13. The purpose of the dissimilar width SCI pulses is to ensure that the falling edge of each SCI pulse occurs within the second half of the mode two time slot 67.

High Voltage Protection Circuit

Figure 14:
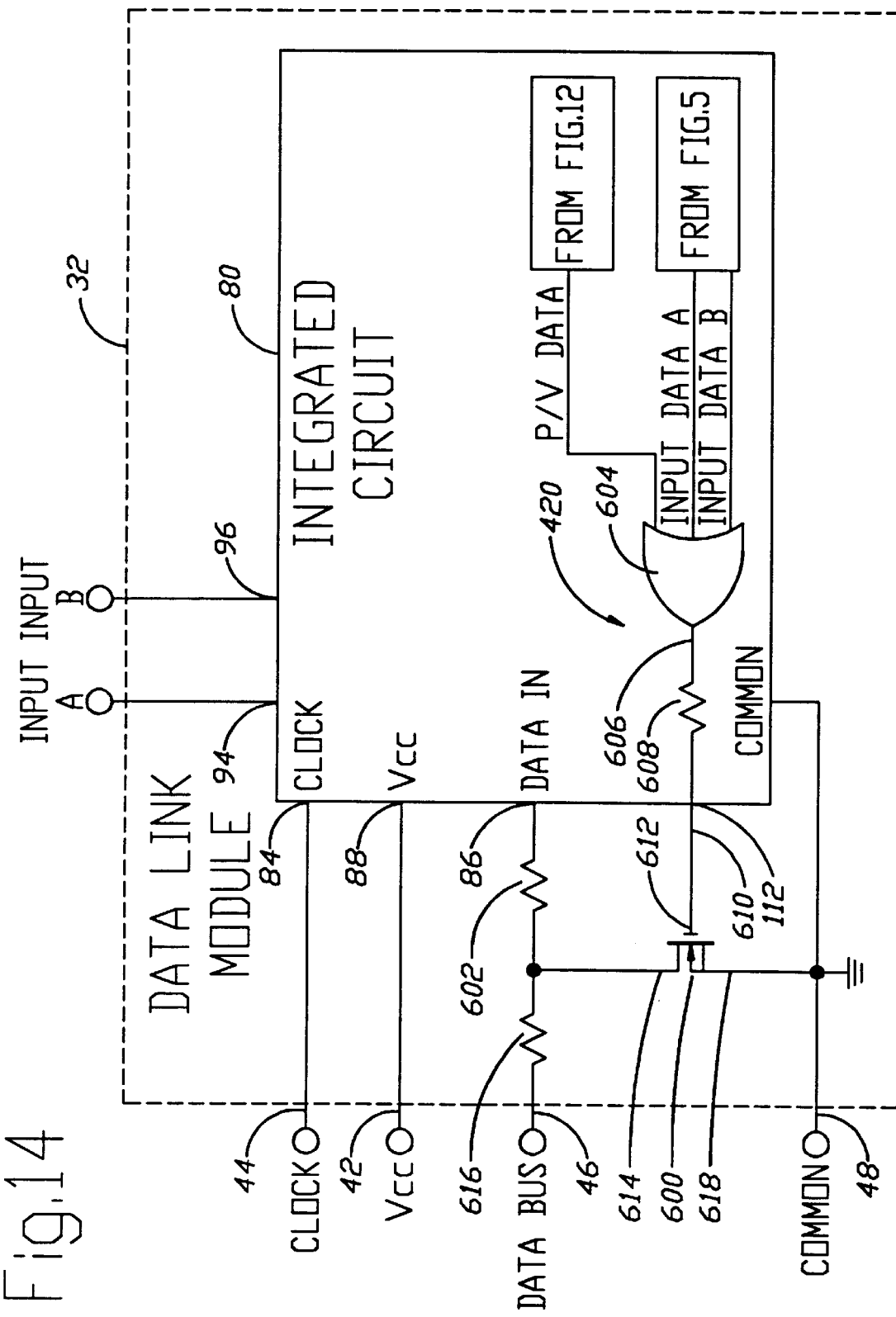
FIG. 14 is a simplified circuit diagram of a data link module showing a logic circuit diagram of the Data Bus Drive functional block of FIGS. 2A and 2B and a transistor driven by the Data Bus Drive output of FIGS. 2A and 2B.

Unlike known data link modules, the integrated circuit 80 of the data link module isolates the channel A and channel B input signals, respectively, from the data bus 46. Unlike the prior art, the signals fed into the input terminals 94 and 96 of the integrated circuit 80 do not control the bus voltage by driving an internal transistor. Rather, the integrated circuit 80 includes a data drive output terminal 112 for connection to an external transistor 600, FIG. 14, for bringing the bus voltage low. As shown in block form in FIG. 2A, a data drive circuit 420 produces a DATA_DRIVE signal. As shown in FIG. 14, the data link module 32 includes an integrated circuit 80 and transistor 600 external to the integrated circuit. A resistor 602 is placed at the data bus input terminal 86, preferably 100 kΩ, in order to limit current into the integrated circuit 80. The data drive circuit 420 is comprised of a three-input OR gate 604 having as inputs P/V_DATA, INPUT_DATA_A and INPUT_DATA_B. The signal at the output terminal 606 of the OR gate 604 passes through a resistor 608 and is available outside of the integrated circuit 80 as the DATA_DRIVE signal 610 on a data drive terminal 112. The DATA_DRIVE signal 610 drives the external transistor 600. FIG. 14 shows a field effect transistor 600 (FET); however, a bipolar transistor is alternatively used. The data bus drive output 610 is connected to the gate 612 of the FET 600. The source 614 of the FET 600 is connected to the data bus 46 through a resistor 616, preferably a 10 Ω resistor. The drain 618 of the FET 600 is connected to ground 48. The transistor 600 is not used as an amplifier but rather as a switch.

During the time slot 422 associated with channel A, INPUT_DATA_A is high. The high INPUT_DATA_A causes the data bus drive signal to be high, thereby causing the FET 600 to conduct. When the FET 600 conducts the data bus voltage is reduced from approximately 9.0 volts which is a logical low or a logical zero to approximately 0.7 volts which is a logical high or a logical one. In a similar fashion, a high INPUT_DATA_B and a high P/V_DATA cause the FET 600 to conduct.

The external transistor 600 is advantageous because it allows the integrated circuit 80 of the data link module 32 to accept higher data bus voltages and currents than the transistor internal to the prior art integrated circuit can accept without breaking down. Furthermore, when exposed to an very high bus voltage, the external transistor 600 breaks down and becomes a low impedance source and protects the relatively expensive integrated circuit 80 from damage. The external transistor 600 advantageously breaks down when the bus voltage reaches about 60 volts thereby protecting the integrated circuit 80 which can withstand at least 60 volts on the bus 46. The external transistor 600 can be easily and inexpensively replaced if damaged; whereas, the integrated circuit 80 is relatively expensive and more difficult to replace.

Data Bus Integrity Checker

Referring now to FIGS. 15 and 16, the data link module 32 has a data bus integrity checker 630 for determining the integrity of the data bus 46. When the integrity checker 630 determines a presence of a fault, the checker 630 prevents the integrated circuit 80 of the data link module 32 from receiving data signals 87 and clock signals 85 from the data bus 46 and clock bus 44, respectively. The checker 630 will respond to three types of faults: a fault to ground; a fault to the operating voltage, including a fault to some voltage intermediate the operating voltage and ground; and a floating or open bus fault. The checker 630 is located on modules 32 that act as output modules 56, such as the data link module 32 shown in FIG. 16, and on modules that act as both input modules 52 and output modules 56, such as the data link module 32 shown in FIG. 15. However, the checker 630 is alternatively present on all modules 32, but does not function on input modules 52.

In the preferred embodiment, the checker 630 is external to the integrated circuit 80 and mounted on the data link module 32. Referring now to FIG. 16, the checker 630 is comprised of three input terminals: a terminal 632 for receipt of signals 87 from the data bus 46, a terminal 634 for receipt of signals 85 from the clock bus 44, and a terminal 636 for receipt of the mode/sync signal 456 from the integrated circuit 80. The checker 630 has two output terminals: a terminal 638 for connection to the data terminal 86 of the integrated circuit 80, and a terminal 640 for connection to the clock terminal 84 of the integrated circuit 80.

Figure 20A:
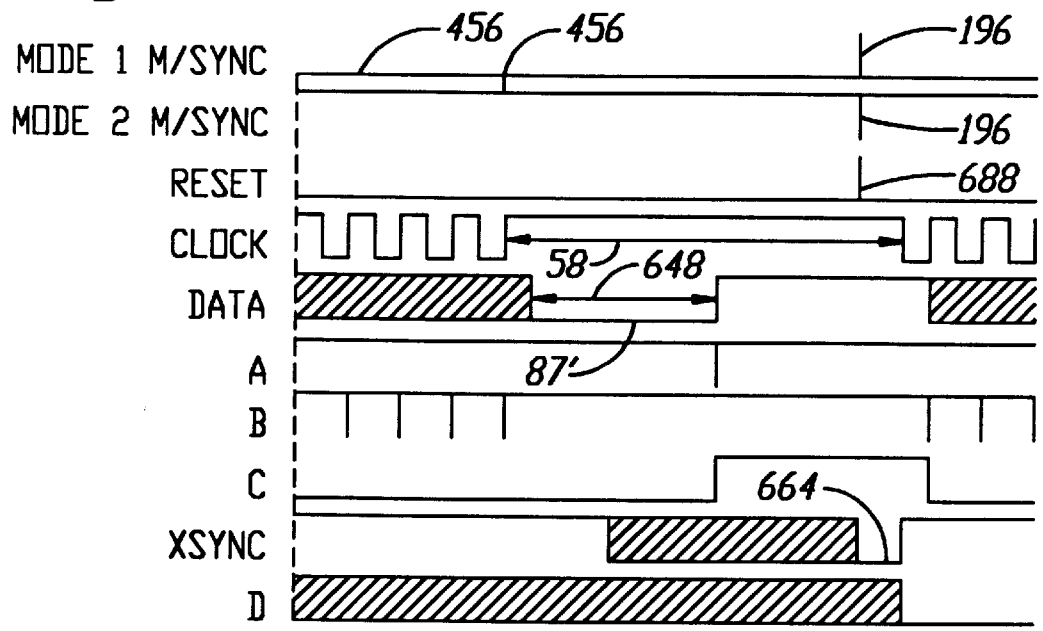
FIG. 20A–20B are timing diagrams of various signals involved in the operation of the Data Bus Integrity Checker of FIG. 19.

The checker 630 acts during the sync period 58 between each time frame 62, FIG. 21. The sync period 58 is produced by the master clock module 36 when the master clock module periodically stops placing clocking pulses on the clock bus 44. A properly functioning data bus 46 is at a relatively high positive voltage (preferably 9–12 volts) when no data signals 87 are present on the data bus. The checker 630 works in conjunction with the master clock module 36. The master clock module 36 exercises the data bus 46 during each sync period 58 by bringing the data bus low for an interval 648, FIG. 20A, and then allowing the data bus to return to its normally high positive voltage state. When the master clock module 36 brings the data bus 46 low it simulates the presence of a signal 87', FIG. 20A, on the data bus. The duration of the interval 648 is not critical; however, the interval 648 is long enough for all logic elements to stabilize but not longer than half the sync period 58. The circuit at the master clock module 36 which brings the data bus low is well known and forms no part of the invention. In mode two operation, the computer interface card (not shown), instead of the clock module 36, performs the operation of bringing the data bus 46 low.

The data bus checker 630 looks for the simulated signal 87' during the sync period 58 between each time frame 62. The checker 630 allows normal operation if the simulated data bus signal 87' is detected. However, the checker 630 prevents the one data link module 32 on which it is mounted from receiving data signals 87 intended for that one module if the simulated signal 87' is not detected. The checker 630 also has an indicator 642 to alert the operator of the control system 30 of the condition of a data bus line 633 leading to the data link module 32 on which the checker is mounted. In this context, the data bus line 633, FIG. 1, is a branch of the data bus 46.

Figure 19:
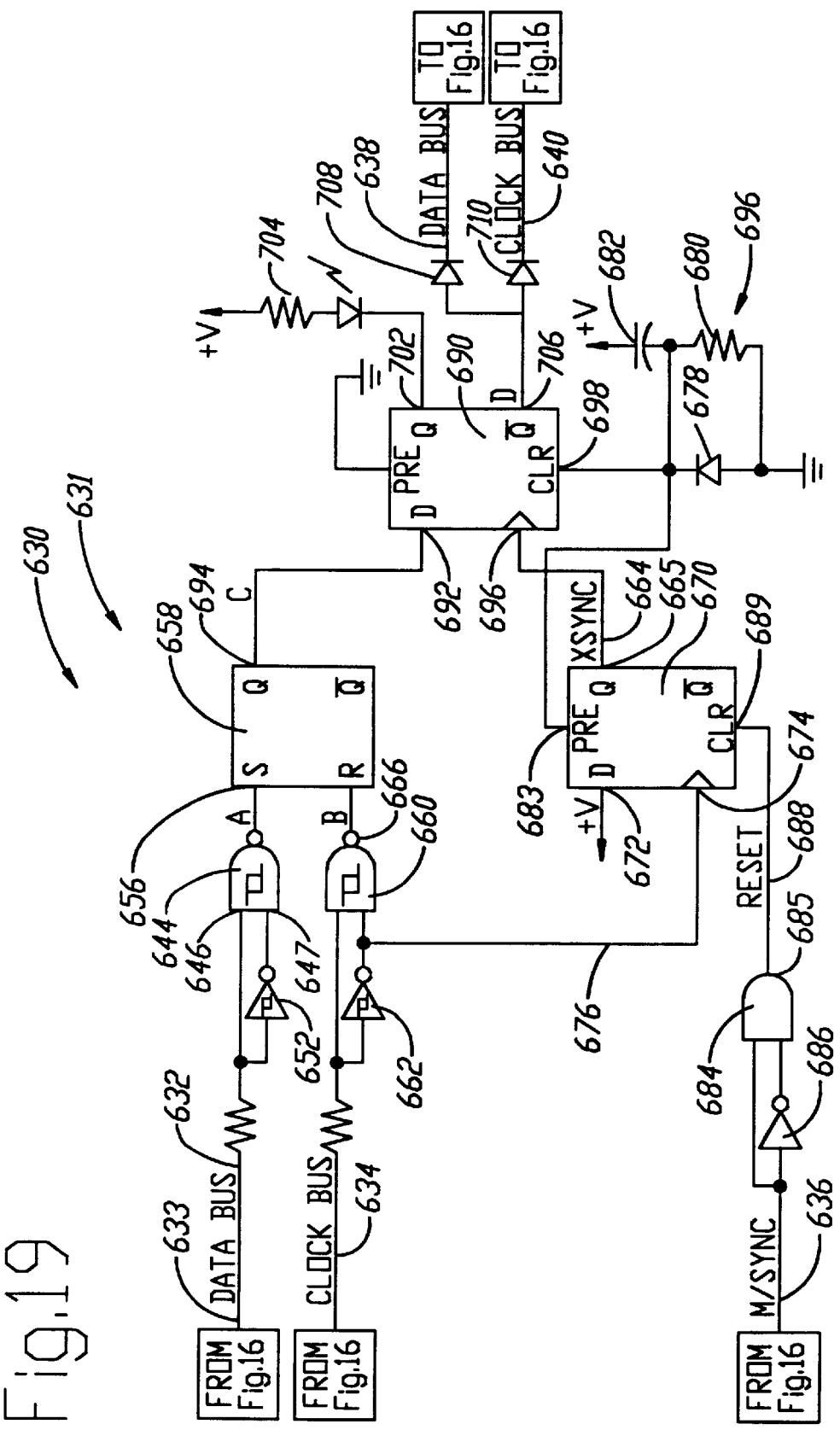
FIG. 19 is a logic circuit diagram of the Data Bus Integrity Checker functional block of FIG. 16.

The circuit 631 of the data bus integrity checker 630 is shown in detail in FIG. 19. A two-input NAND gate 644 has both inputs 646 and 647 connected to the data bus 46; however, a delay element with a logical inverter 652 is between the data bus 46 and one 647 of the two inputs of the NAND gate. The output terminal 654 of the NAND gate 644 is coupled to the S input terminal 656 of an RS flip-flop 658. When the data bus voltage transitions from low to high, a relatively short duration pulse from the output of the NAND gate 644 sets the RS flip-flop 658. In a similar manner, another NAND gate 660 and another delay element/inverter 662 produces another relatively short duration pulse at every low-to-high transition of the master clock signal 85. An output terminal 666 of the other NAND gate 660 is coupled to the R input terminal 668 of the RS flip-flop 658. The RS flip-flop 658 is reset on every clock cycle 61; however, during the sync period 58 there are no clock cycles, by definition. The two NAND gates 644 and 660 and the two delay elements 650 and 662 are Schmitt triggered in order to perform in a hysteresis-like manner to overcome the slow rise time of the data 87 and clock 85 signals and to overcome the noise on the data 46 and clock 44 buses.

Figure 20B:
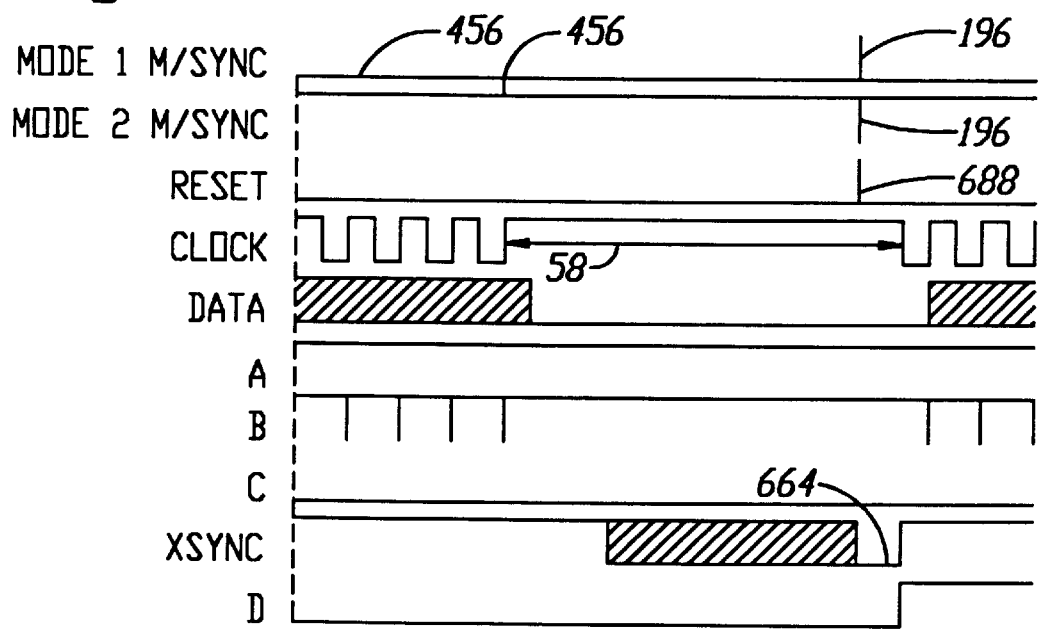

A synchronous data flip-flop 670 has its D input terminal 672 connected to the power supply positive voltage source (not shown), thereby causing the flip-flop 670 to set whenever the clocking input terminal 674 to the flip-flop 670 goes high. The clocking input terminal 674 is edge-sensitive and it responds only to a rising edge of a signal. A line 676 is connected from the delay element/inverter 662 to a clocking input 674 of the flip-flop 670. Therefore, the flip-flop 670 is set on every high-to-low transition of the master clock signal 85. When the flip-flop 670 is set, a signal XSYNC 664, FIGS. 20A and 20B, appears on a Q output terminal 665 of the flip-flop 670.

At start up, the flip-flop 670 is initially asynchronously set by a local power-on-reset circuit 696 comprising a diode 678, a resistor 680 and a capacitor 682 connected to the preset terminal (PRE) 683 of the flip-flop. The integrated circuit 80 produces a sync pulse 196 at its mode/sync terminal 110 during the sync period 58. An AND gate 684 in combination with a delay element/inverter 686 produces a reset pulse 688, FIGS. 20A and 20B, at the output 685 of the AND gate on a low-to-high transition of the sync pulse 196. The reset pulse 688 is fed into a asynchronous clear terminal (CLR) 689 of the flip-flop 670. Therefore, the signal XSYNC produced at the output Q 674 of the flip-flop 670 goes low in response to the sync pulse 196 on the mode/sync terminal 110 of the integrated circuit 80. On the next low-to-high transition of the signal at the clocking terminal 674 of the flip-flop 670 (which occurs on the high-to-low transition of the master clock signal 85), the flip-flop is set again and it remains set until the next time frame 62.

A second data flip-flop 690 has its D input terminal 692 connected to the Q output terminal 694 of the RS flip-flop 658. The second data flip-flop 690 has its clocking terminal 696 connected to the Q output terminal 674 of the data flip-flop 670. The asynchronous clear terminal (CLR) 698 of the second data flip-flop 690 is connected to the local power-on-reset circuit 676. On start-up, the flip-flop 690 is reset and its Q output terminal 702 is low. As a result, at start-up, a light emitting diode (LED) 704 connected between the power supply positive voltage source and the Q terminal 702 illuminates. In addition, at start-up, aQ output terminal 706 goes high, thereby placing the power supply positive voltage on the flip-flop 690 side of two diodes 708 and 710.

The second data flip-flop 690 samples the state of the Q output terminal 694 of the RS flip-flop 658 at the end of each sync period 58. If a rising edge is detected on the data bus 46 by the first data flip-flop 670 during the sync period 58, the Q output terminal 702 of the second data flip-flop 690 latches high, reverse biasing the diodes 708 and 710, and allowing normal operation of the data link module 32. The LED 704 remains off. However, if a rising edge is not detected, the Q output terminal 702 of the second data flip-flop 690 is latched low. The absence of a rising edge is indicative of a fault on the data bus 46. The low Q output causes the LED 704 to illuminate. Diode 708 is connected between the Q terminal 706 of the flip-flop 690 and the data bus input terminal 86 of the integrated circuit 80. Diode 710 is connected between the Q terminal 706 of the flip-flop 690 and the clock bus input terminal 84 of the integrated circuit 80. If the data bus 46 has a fault, the Q terminal 706 of the flip-flop 690 will be high. A high Q output terminal 706 cause the two diodes 708 and 710 to conduct when the clock bus 44 or data bus 46 lines attempt to go low. When diode 708 is conducting, the data bus input terminal 86 of the integrated circuit 80 remains at the high voltage level indicative of an absence of a data signal 87. The integrated circuit 80 is thereby immediately prevented from responding to signals 87 on the data bus 46. Unlike the prior art, there is no significant delay between the detection of a fault and the prevention of the data link module 32 from receiving data bus signals 87. Therefore, unlike the prior art, the data link module 32 will immediately stop producing control signals for controlling one or more output devices connected to the data link module 32. This is advantageous because any signals 87 on the data bus 46 are probably false due to the fault condition on the data bus. When diode 710 is conducting, the clock bus input terminal 84 of the integrated circuit 80 remains at the high voltage level thereby producing, at only the one data link module 32, a loss of the master clock signal 85. The clock loss detect circuit 240 internal to the integrated circuit 80 turns off the integrated circuit shortly after the checker 630 began preventing the integrated circuit from receiving the master clock signal 85.

While a detailed description of the preferred embodiment of the invention has been given, it should be appreciated that many variations can be made thereto without departing from the scope of the invention as set forth in the appended claims.

I claim:

1. In a data ink module having an integrated circuit with an data bus terminal for receipt of digital data signals from a data bus, a local input terminal for receipt of input signals from a local input device, and a time division multiplexing address defining one of a plurality of time slots between synchronization pulses, a high voltage protection circuit, comprising:

a switchable breakdown device with an input junction and a pair of transconductive outputs and having a breakdown voltage at which a short is created between the transconductive outputs;

means for connecting one of the transconductive outputs to a data bus susceptible to voltage spikes in excess of the breakdown voltage and detrimental to the integrated circuit if applied to the input;

means for connecting the other transconductive output to a reference potential; and means responsive to the address and to the signals at at least one of the local input terminal and the data bus terminal to provide a drive signal to the input junction of the switchable breakdown device to provide an appropriate data signal on the data bus during the time slot of the address of the data link module, said switchable breakdown device breaking down to protect the integrated circuit from said voltage spikes when not being driven to provide data signals to the data bus.

2. The data link module of claim 1 including a current limiting resistor connected in series between the input terminal and the data bus.

3. The data link module of claim 2 in which the current limiting resistor has a resistance on the order of 100 kΩ.

4. The data link module of claims 3 in which the input limiting resistor is made of ceramic.

5. The data link module of claim 1 in which the switchable breakdown device is a one of a field effect transistor and a bipolar transistor.

6. The data link module of claim 5 in which the switchable breakdown device has a breakdown voltage on the order of 60 volts.

7. The data link module of claim 1 further including an input protection circuit for detecting a selected one of a plurality of different operating conditions of the data link module and means responsive to said selected condition detection to inhibit the outputting of data signals to the data bus in response to changes of the input signals from the local input device.

8. The data link module of claim 7 wherein one of the plurality of different operating conditions of the data link module includes a mode of operation in which the data link module is being programmed.

9. The data link module of claim 7 wherein one of the plurality of different operating conditions of the data link module includes a mode of operation in which the data link module programming is being verified.

10. The data link module of claim 7 wherein one of the plurality of different operating conditions of the data link module includes sensing an initial application of power to the data link module, to inhibit the outputting of data signals to the data bus in response to changes of the input signals from the local input device until the power to the data link module has stabilized for a preselected period of time.

* * * * *